United States Patent
Ha et al.

(10) Patent No.: US 11,840,221 B2
(45) Date of Patent: Dec. 12, 2023

(54) METHOD FOR ALERTING DANGER SITUATIONS OF MOVING OBJECT AND APPARATUS FOR THE SAME

(71) Applicants: HYUNDAI MOTOR COMPANY, Seoul (KR); KIA MOTORS CORPORATION, Seoul (KR); AJOU UNIVERSITY INDUSTRY-ACADEMIC COOPERATION FOUNDATION, Suwon-si (KR)

(72) Inventors: Jae Jun Ha, Hwaseong-si (KR); Ilsoo Yun, Yongin-si (KR); Sangmin Park, Chungcheongnam-do (KR); Sungho Park, Yongin-si (KR); Harim Jeong, Suwon-si (KR); Cheolwoo Kwon, Suwon-si (KR); Jiwon Kim, Suwon-si (KR); Kiyeon Park, Suwon-si (KR)

(73) Assignees: HYUNDAI MOTOR COMPANY, Seoul (KR); KIA MOTORS CORPORATION, Seoul (KR); AJOU UNIVERSITY INDUSTRY-ACADEMIC COOPERATION FOUNDATION, Suwon-si (KR)

( * ) Notice: Subject to any disclaimer, the term of this patent is extended or adjusted under 35 U.S.C. 154(b) by 282 days.

(21) Appl. No.: 17/173,606

(22) Filed: Feb. 11, 2021

(65) Prior Publication Data
US 2021/0245742 A1 Aug. 12, 2021

(30) Foreign Application Priority Data
Feb. 11, 2020 (KR) .................. 10-2020-0016365

(51) Int. Cl.
*B60W 30/095* (2012.01)
*G06K 9/00* (2022.01)
(Continued)

(52) U.S. Cl.
CPC ............. *B60W 30/09* (2013.01); *B60Q 1/507* (2022.05); *B60Q 1/525* (2013.01);
(Continued)

(58) Field of Classification Search
CPC ............. B60W 30/095; B60W 50/14; B60W 2050/14; B60W 2554/4041; B60W 2554/4049; G06V 20/58
See application file for complete search history.

(56) References Cited

U.S. PATENT DOCUMENTS

| 10,282,996 B1 * | 5/2019 | Buchbut | ................ G08G 1/164 |
| 2012/0299713 A1 * | 11/2012 | Elia | ......................... G01S 19/17 340/435 |

(Continued)

FOREIGN PATENT DOCUMENTS

| DE | 102017217961 A1 * | 4/2018 | ............. B60Q 9/008 |
| KR | 20090078976 A * | 7/2009 | |

OTHER PUBLICATIONS

DE-102017217961-A1, English Translation, (Year: 2018).*
KR 20090078976 A, English Translation, (Year: 2009).*

*Primary Examiner* — Anne Marie Antonucci
*Assistant Examiner* — Kyle S Park
(74) *Attorney, Agent, or Firm* — MORGAN, LEWIS & BOCKIUS LLP

(57) ABSTRACT

A method of detecting a collision in a moving object includes: detecting, by the moving object, an object and an event; determining a situation as at least one of an emergency situation, a manageable situation, or a general situation in response to the detected object and the detected (Continued)

event; determining whether or not it is possible to transmit a warning message for the detected event to the detected object upon determining that situation is the manageable situation; and transmitting collision possibility information to the detected object based on a warning alarm system upon determining that it is impossible to transmit the warning message for the detected event to the detected object.

20 Claims, 22 Drawing Sheets

(51) Int. Cl.
  *B60W 50/14* (2020.01)
  *B60W 30/09* (2012.01)
  *G06V 20/58* (2022.01)
  *B60Q 1/50* (2006.01)

(52) U.S. Cl.
  CPC .......... *B60W 30/095* (2013.01); *B60W 50/14* (2013.01); *G06V 20/58* (2022.01); *B60W 2050/143* (2013.01); *B60W 2554/4041* (2020.02); *B60W 2554/4049* (2020.02)

(56) References Cited

U.S. PATENT DOCUMENTS

2019/0193750 A1* 6/2019 Kim ...................... B60W 10/10
2020/0346663 A1* 11/2020 Park ................. G08G 1/096741

* cited by examiner

- S319: Does the second moving object recognizes situation?

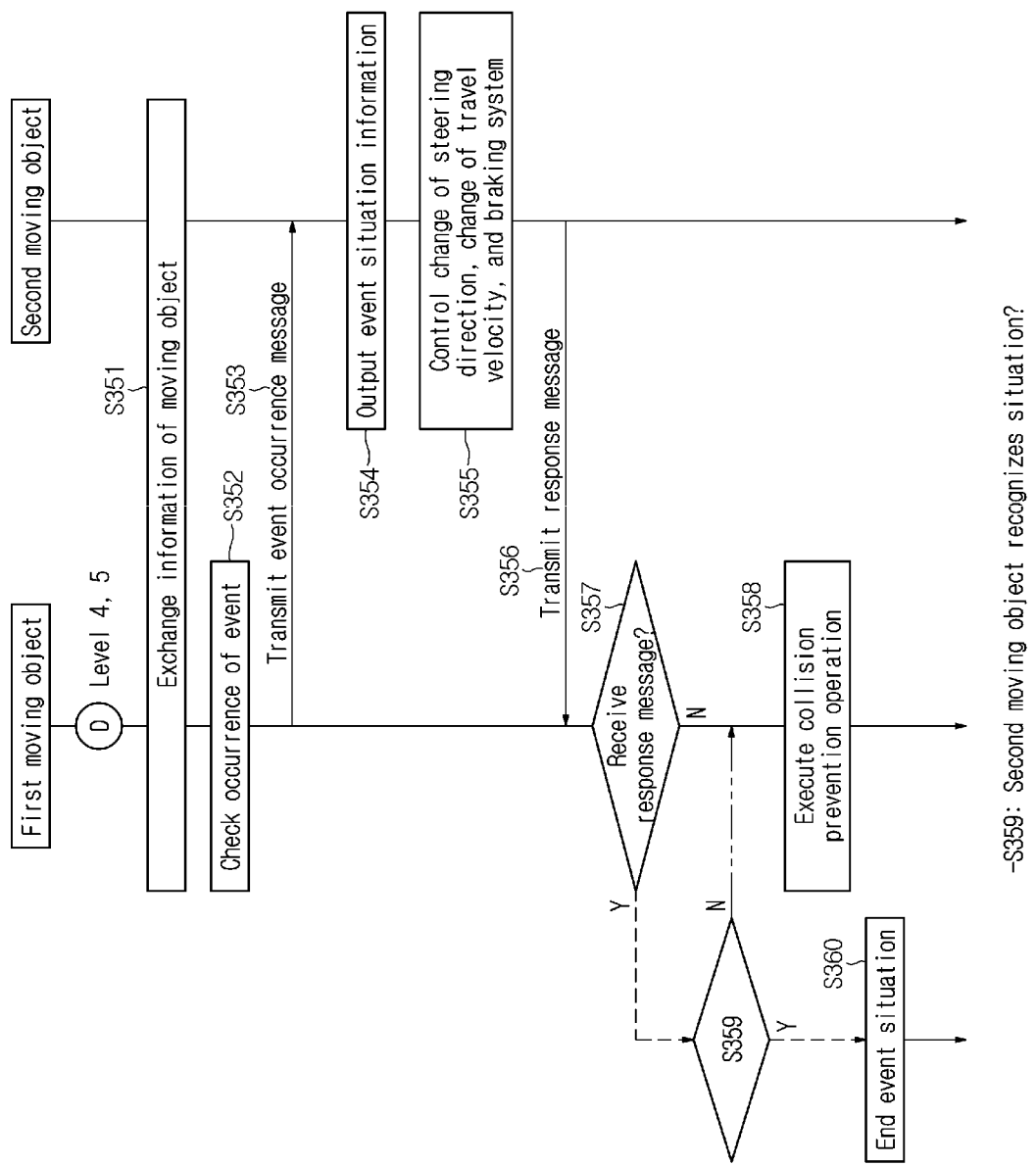

It is impossible to transmit warning message to object with collision risk. Velocity is being adjusted.

$f(V_V, V_P, D_V, D_P, L_{VC}, L_{PC}) >$ Threshold value

First operation mode -> Driving mode on general road
Second operation mode -> Driving mode on back lane First operation mode : signal exchange between moving objects, signal exchange with RSU in special situation like crosswalk and intersection

| Icon | Event situation |
|---|---|
|  | Pedestrian moves on crosswalk |
|  | Two-wheeled vehicle moves |
|  | Moving object accident |
|  | Forward accident |

… (1) METHOD FOR ALERTING DANGER SITUATIONS OF MOVING OBJECT AND APPARATUS FOR THE SAME

CROSS REFERENCE TO RELATED APPLICATION

The present application claims the benefit of priority to Korean Patent Application No. 10-2020-0016365, filed on Feb. 11, 2020 in the Korean Intellectual Property Office, the entire contents of which is incorporated herein for all purposes by this reference.

TECHNICAL FIELD

The present disclosure relates to a method and an apparatus for alerting a danger situation of a moving object. More particularly, the present disclosure relates to a method and an apparatus for detecting a danger situation based on a position, a speed and a moving direction of a pedestrian and for notifying a pedestrian of the danger situation.

BACKGROUND

Along with technical advances, a vehicle can communicate with electronic devices in the vehicle using various communication methods. In addition, not only such electronic devices but also various apparatuses can be used as mobile devices for the communication, and communication methods using a range of apparatuses have been developing.

Among vehicles, there has been a focus on developing an autonomous vehicle which can automatically recognize, judge and control a driving condition by utilizing information collected through mounted sensors and a Vehicle-to-Everything (V2X) communication apparatus without the driver's intervention. According to the standard proposed by the Society of Automotive Engineers (SAE), autonomous vehicles are defined by a total of 6 levels, among which Level 3 (conditionally autonomous), Level 4 (highly autonomous) and Level 5 (fully autonomous) correspond to autonomous driving in a real sense. Various convenience functions may be provided to vehicle drivers in such autonomous vehicles. In addition, techniques for detecting other vehicles and pedestrians and preventing accidents have been developing, which will be described below.

The information included in this Background section is only for enhancement of understanding of the general background of the present disclosure and may not be taken as an acknowledgement or any form of suggestion that this information forms the prior art already known to a person skilled in the art.

SUMMARY

The present disclosure is directed to provide a system for sensing a danger situation in an autonomous vehicle and automatically notifying the danger situation. In addition, the present disclosure is directed to provide a method and apparatus for controlling a moving object by considering a road type or situation.

According to one aspect of the present disclosure, a method of detecting a collision in a moving object may be provided. The method may include: detecting, by the moving object, an object and an event; determining, by a processor of the moving object, a situation as at least one of an emergency situation, a manageable situation, or a general situation in response to the detected object and the detected event; determining whether or not it is possible to transmit a warning message for the detected event to the detected object upon determining that the situation is the manageable situation; and transmitting collision possibility information to the detected object based on a warning alarm system upon determining that it is impossible to transmit the warning message for the detected event to the detected object.

According to another aspect of the present disclosure, a moving object detecting a collision may be provided. The moving object may include a transceiver for transmitting and receiving a signal and a processor for controlling the transceiver. The processor may detect an object and an event, determine whether or not a situation is a manageable situation based on the detected object and the detected event, determine whether or not it is possible to transmit a warning message for the event to the detected object when the situation is determined as the manageable situation, and transmit collision possibility information to the object based on a warning alarm system when it is impossible to transmit the warning message for the event to the detected object.

According to another aspect of the present disclosure, a method of detecting a collision in a moving object may be provided. The method may include: determining an operation mode based on a road in which the moving object is driving; detecting an object and an event based on the operation mode; and determining collision possibility based on the detected object and the detected event. Herein, the moving object may detect the object and the event based on a first operation mode when the road in which the moving object is driving is a first type road. When the road in which the moving object is driving is a second type road, the moving object may detect the object or the event based on a second operation mode.

According to another aspect of the present disclosure, a moving object detecting a collision may be provided. The moving object may include a transceiver for transmitting and receiving a signal and a processor for controlling the transceiver. Herein, the processor may determine an operation mode based on a road in which the moving object is driving, detects an object and an event based on the operation mode, and determines collision possibility based on the detected object and the detected event. When the road in which the moving object is driving is a first type road, the moving object may detect the object and the event based on a first operation mode. When the road in which the moving object is driving is a second type road, the moving object may detect the object or the event based on a second operation mode.

According to the present disclosure, a method and apparatus for sensing a danger situation in an autonomous vehicle and for notifying the danger situation.

In addition, according to the present disclosure, a method and apparatus by which a moving object may detect a pedestrian on a back lane may be provided.

The technical objects of the present disclosure are not limited to the above-mentioned technical objects, and other technical objects that are not mentioned will be clearly understood by those skilled in the art through the following descriptions.

BRIEF DESCRIPTION OF THE DRAWINGS

FIG. 3D illustrates a warning alarm operation or a collision prevention operation in Level 4 or Level 5.

DETAILED DESCRIPTION

Figure 1:
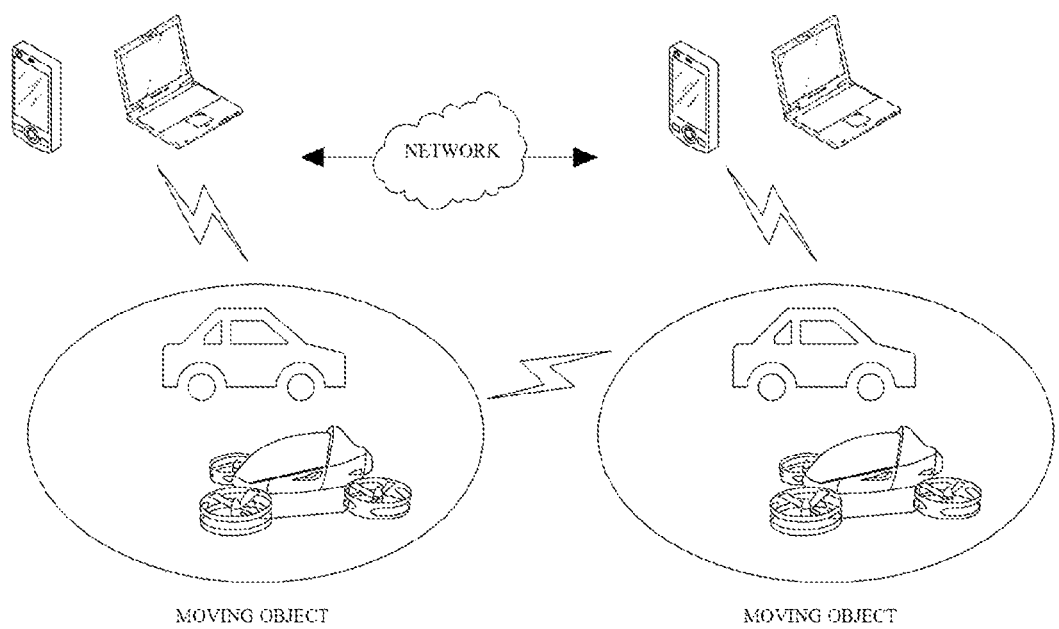
FIG. 1 is a view showing a method by which a moving object communicates with another moving object or a device through a network, according to an embodiment of the present disclosure.

Hereinafter, embodiments of the present disclosure will be described in detail with reference to the accompanying drawings, which will be easily implemented by those skilled in the art. However, the present disclosure may be embodied in many different forms and is not limited to the embodiments described herein.

In the following description of the embodiments of the present disclosure, a detailed description of known functions and configurations incorporated herein will be omitted when it may make the subject matter of the present disclosure rather unclear. Parts not related to the description of the present disclosure in the drawings are omitted, and like parts are denoted by similar reference numerals.

In the present disclosure, when a component is referred to as being "connected", "coupled", or "connected" to another component, it is understood that not only a direct connection relationship but also an indirect connection relationship through an intermediate component may also be included. When a component is referred to as "comprising" or "having" another component, it may mean further inclusion of another component not the exclusion thereof, unless explicitly described to the contrary.

In the present disclosure, the terms first, second, etc. are used only for the purpose of distinguishing one component from another, and do not limit the order or importance of components, etc., unless specifically stated otherwise. Thus, within the scope of this disclosure, a first component in one embodiment may be referred to as a second component in another embodiment, and similarly a second component in one embodiment may be referred to as a first component.

In the present disclosure, components that are distinguished from each other are intended to clearly illustrate each feature. However, it does not necessarily mean that the components are separate. That is, a plurality of components may be integrated into one hardware or software unit, or a single component may be distributed into a plurality of hardware or software units. Thus, unless otherwise noted, such integrated or distributed embodiments are also included within the scope of the present disclosure.

In the present disclosure, components described in the various embodiments are not necessarily essential components, and some may be optional components. Accordingly, embodiments consisting of a subset of the components described in one embodiment are also included within the scope of the present disclosure. Embodiments that include other elements in addition to the elements described in the various embodiments are also included in the scope of the present disclosure.

Methods of accomplishing the advantages and features of the present disclosure will be apparent in reference to the embodiments that are described below in detail in conjunction with the accompanying drawings. However, the present disclosure is not limited to the embodiments set forth herein but may be embodied in many different forms. The present embodiments are provided to make disclosed contents of the present disclosure thorough and complete and to completely convey the scope of the disclosure to those with ordinary skill in the art.

FIG. 1 is a view illustrating a method where a moving object communicates with another moving object or device through a network. Referring to FIG. 1, a moving object may communicate with another moving object or another device. The moving object may communicate with another moving object or another device based on cellular communication, WAVE communication, DSRC (Dedicated Short Range Communication) and other communication systems. In other words, a cellular network like LTE and 5G, a WiFi network and a WAVE network may be used. In addition, a short-range network like DSRC for moving objects may be used. The above-described embodiments are not limited.

In addition, with regard to communication of the moving object, for the security of the moving object, a communication module dedicated for devices inside the moving object may be separated from a module for communicating with a device outside the moving object. For example, only devices within a certain range inside the moving object may perform communication such as WiFi communication based on security. For example, a communication module may be included for communication between the moving object and the driver's person device. In other words, the moving object and the driver's personal device may use a communication network blocked from an external communication network. Further, the moving object may include a communication module performing communication with an external device. The above-described module may be implemented as a single module. In other words, based on a single module, the moving object may communicate with anther device, which is not limited to the above-described embodiment. In other words, communication in the moving object may be embodied in various methods and is not limited to the above-described embodiment.

Herein, the moving object may refer to a device. For example, the moving object may be a vehicle (including an autonomous vehicle or an automated vehicle), a drone, a mobility, a mobile office, a mobile hotel, a PAV (Personal Air Vehicle), UAM (Urban Air Mobility), or eVTOL (Electric Vertical Take-Off and Landing). In addition, the moving object may be any other mobile device and is not limited to the above-described embodiments.

Figure 2:
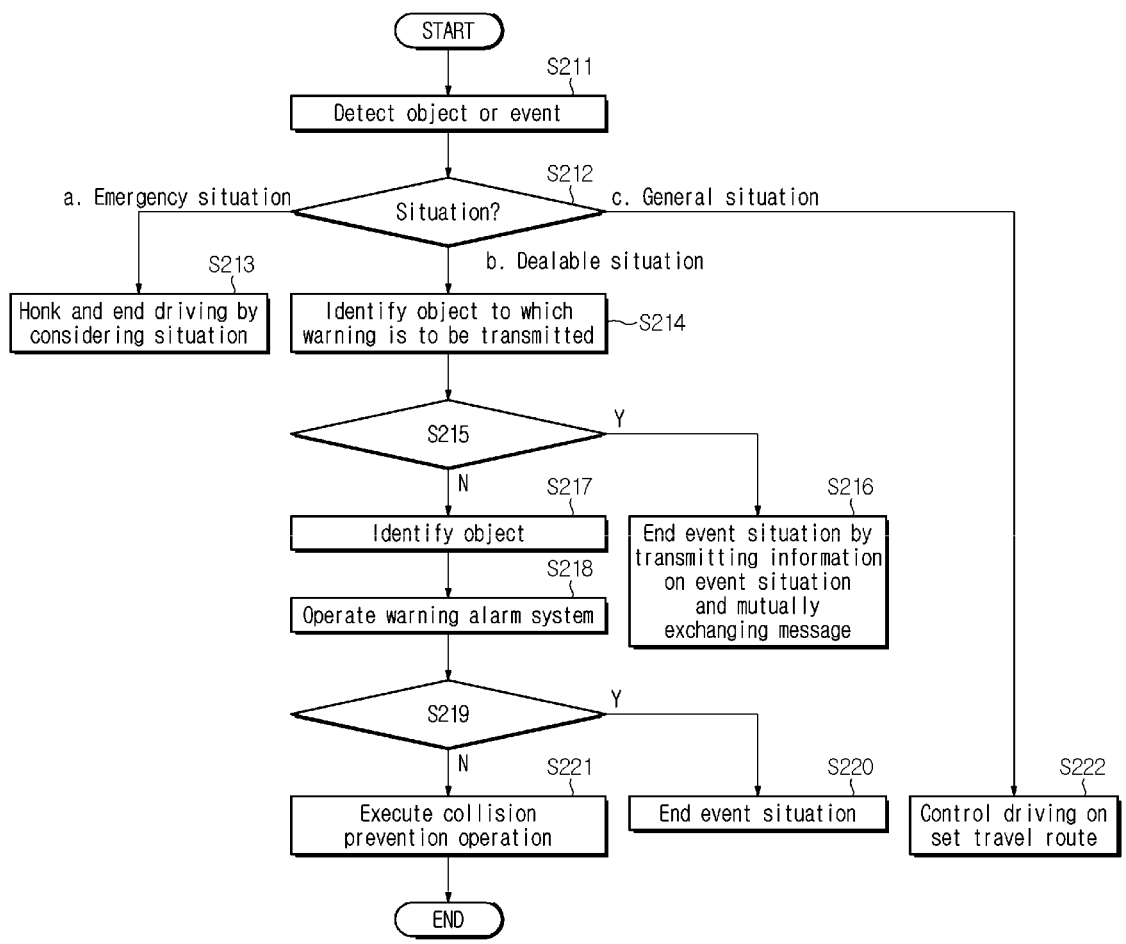
FIG. 2 is a view showing an operation method by which an autonomous vehicle detects an object and an event, according to an embodiment of the present disclosure.

FIG. 2 is a view showing an operation method by which an autonomous vehicle detects an object or an event, according to an embodiment of the present disclosure.

The moving object may vary as described above. For example, the moving object may be an autonomous vehicle. Herein, the autonomous vehicle may refer to an apparatus that is capable of automatically recognizing, determining and controlling a driving condition, without the driver's intervention, by using information collected through mounted sensors and a V2X communication apparatus. That is, the autonomous vehicle may autonomously operate through a plurality of sensors and a communication apparatus, even when there is no human control.

Referring to FIG. 2, the autonomous vehicle may detect an object or an event (S211). The object may be at least one of another autonomous vehicle, a general moving object, or a pedestrian. In addition, the object may be an object that is sensed by an autonomous vehicle and is not limited to a specific object.

The event may be a collision situation recognition. The autonomous vehicle may recognize a position, a velocity and a direction of the autonomous vehicle. In addition, the autonomous vehicle may recognize a position, a velocity and a direction of an object. The autonomous vehicle may determine collision possibility through the position, velocity and direction of the autonomous vehicle and the position, velocity and direction of the object, which will be described below. In addition, the event may be a case in which a sensing value exceeding a reference value set in an autonomous vehicle is detected. That is, the event may be information sensed by an autonomous vehicle and is not limited to the above-described embodiment.

Next, the moving object may check a situation between the moving object and an object (S212). The situation between the moving object and the object may include an emergency situation, a manageable situation, and a general situation. The moving object may determine collision possibility through a sensor installed in the moving object, and when collision avoidance is difficult, determine the emergency situation ("a" after S212). As an example, the moving object may determine collision avoidance possibility based on a threshold value, and when collision avoidance is impossible, determine the emergency situation. That is, when the moving object senses an accident and determines that collision avoidance is impossible, it may be the emergency situation. On the other hand, in the case of an event where there is an extra time to a threshold value and the moving object is sufficiently capable of avoiding a collision, the moving object may determine that it is not an emergency situation. When the situation is not the emergency situation but requires an additional operation of the moving object like a bypassing operation, it may be the manageable situation ("b" after S212). As an example, the manageable situation may have a threshold value that is greater or equal to a first threshold value and less than a second threshold value. In addition, in case the threshold value is greater or equal to the second threshold value or an event is not sensed, it may be the general situation ("c" after S212).

When determining the emergency situation ("a" after S212), the moving object may activate a warning alarm. In addition, the moving object may end driving (S213).

The warning alarm of the moving object may be transmitted to a driver inside the moving object or to an outside object. The warning alarm of the moving object may operate inside the moving object to provide information on the emergency situation to the driver. Although the moving object is incapable of avoiding the emergency situation, the moving object may warn the driver of the emergency situation so that the driver may be prepared. In addition, the moving object may provide information on the emergency situation to an outside object. Herein, the information on the emergency situation may be adaptively provided to the outside object according to a type of the outside object. When the outside object is a pedestrian, the moving object may provide information on the occurrence of an emergency situation to the pedestrian so that the pedestrian may be prepared for the emergency situation. That is, the moving object as an autonomous vehicle may determine an emergency situation by itself and activate a warning alarm system based on determined information. When determining a manageable situation ("b" after S212), the moving object may check an object to which a warning is to be transmitted (S214).

Next, the moving object may check whether or not the object to which the warning is to be transmitted is an agent capable of exchanging a message (S215).

An object may be at least one of another autonomous vehicle, a general moving object, or a pedestrian. Correspondingly, the object to which a warning is to be transmitted may be at least one of an autonomous vehicle, a general moving object, or a device (e.g., a portable terminal) carried by a pedestrian. More specifically, the moving object may be an autonomous vehicle, and the object to which a warning is to be transmitted may be an autonomous vehicle. Herein, the autonomous vehicles may communicate with each other, thereby exchanging a message. Accordingly, the moving object may provide information on the possibility of an accident to an autonomous vehicle as a corresponding object.

In addition, when the moving object is a general moving object, the moving object may be capable of communicating and receiving a message about the possibility of accident. That is, the moving object may determine whether or not the object to which a warning is to be transmitted is capable of communication, and if possible, may provide information on the occurrence of an accident (or an emergency situation).

In addition, the object to which a warning is to be transmitted may be a pedestrian. The pedestrian may have a device capable of communication. Based on this, the moving object may detect the device carried by the pedestrian as the object to which a warning is to be transmitted. The moving object may identify the position information of the object based on a device (e.g., a portable terminal) carried by the object. In addition, the moving object may detect an event based on its own position information and the position information of the object.

The moving object may transmit a signal for an event situation to an object to which a warning is to be transmitted. For instance, a device carried by a pedestrian may also receive a signal for an event situation. More specifically, respective devices and moving objects may be capable of setting an emergency call by considering an event situation. An emergency call setting may be a call setting that is a communication function set with consideration of a specific event situation and is used only for an emergency purpose. Accordingly, an emergency call may be used without special identifier or security. Herein, the moving object may transmit a message on a specific event situation to a pedestrian's device through the above-described emergency call. Herein, after receiving the message on the event situation, the pedestrian's device may transmit information on the event situation to the pedestrian through notification or display.

When an object to which a warning is to be transmitted is capable of communication, the moving object may transmit information on an event situation to the object and make an event situation end through an exchange of message (S216). The moving object may receive a confirmation message about travel route change considering the occurrence of an event (or an accident) from another moving object, a pedestrian's device may check whether or not notification or information on an event situation is confirmed by a user, and based on this, may transmit the moving object check message to the moving object. Thus, the moving object may terminate the event situation. Then, the moving object may avoid the accident situation through the received information and the sensed information.

On the other hand, it is possible to consider a case in which an object to which a warning is to be transmitted is incapable of communication. Herein, since the object is incapable of identifying the possibility of an accident, the moving object itself needs to identify the object (S217). Herein, the moving object may operate a warning alarm system with consideration that the object is incapable of communication (S218). For example, the moving object may selectively activate, as a warning alarm entity, at least one of a horn, a headlight, an emergency light, or an external display apparatus. Herein, the moving object may confirm whether or not the object has recognized the moving object (S219). The moving object may recognize an avoiding motion of the object through a camera or any other sensor. In addition, the moving object may recognize that the object gets out of a travel route. When the object recognizes an event and operates as described above (YES: S219), the moving object may detect the operation and end the event situation (S220).

On the other hand, when the object does not recognize an event (NO: S219), the moving object may perform a collision prevention operation after determining that an accident is unavoidable (S221). Herein, the collision prevention operation may include an operation of ending the driving of the moving object or an operation of bypassing the object and then proceeding.

Furthermore, the moving object may operate to checking an object's recognition of an event by driving a warning alarm entity by stages. For example, the moving object may continuously check whether or not an object recognizes an event by increasing the volume of horn in steps from a reference volume to a maximum volume. Moreover, the moving object may continuously check the possibility of an accident by constantly comparing the above-described threshold value. Herein, the reference volume of horn may be set by reflecting a risk. When the possibility of collision is high based on a distance to an object and a movement direction of the object, the reference volume (dB.) of horn may be set to be relatively high. In addition, a reference volume of horn may be set by considering a position of the moving object or a situation. The reference volume of horn may be set by considering whether the moving object runs on a road near a residential area or on a road near a commercial district. The volume of horn may be set by considering time. The reference volume of horn may be differently set according to morning hours (6~10), daytime hours (10~17) and night hours (17~6). The moving object may perform driving of a warning alarm entity in steps. For example, the moving object may drive an external display in Step 1. When it is impossible for an object to recognize an event, the moving object may drive a head light or an emergency light in Step 2. When it is impossible for the object to recognize the event, the moving object may drive a horn in Step 3.

As described above, an object may be at least one of an autonomous vehicle, a general moving object, or a pedestrian. Each object to which a warning is to be transmitted may be at least one of an autonomous vehicle, a general moving object, or a device (e.g., a portable terminal) carried by a pedestrian. Moreover, it is possible to set various levels at which autonomous driving may be executed (hereinafter, referred to as "autonomous driving levels"). Based on them, autonomous vehicles may be classified into various types. Autonomous driving levels may be classified into Level 0, Level 1, Level 2, Level 3, Level 4, and Level 5. The criteria of each level may be illustrated as in Table 1 below.

TABLE 1

| Level | Definition | Driving agent | Agent responding to emergency situation |
|---|---|---|---|
| 0 | Driver executes every operation related to driving. | Driver | Driver |
| 1 | System executes steering, accelerating or decelerating under some driving conditions. | Driver | Driver |
| 2 | System executes steering, accelerating and decelerating under some driving conditions. | Driver | Driver |
| 3 | System executes every driving operation under some driving conditions, and the driver starts or resumes driving in an emergency situation. | Moving object | Driver |
| 4 | System executes every driving operation under some driving conditions, and the driving automation system responds to an emergency situation. | Moving object | Moving object |
| 5 | System executes every driving operation under all driving conditions that can be managed by the driver. | Moving object | Moving object |

When an object is identified or determined as an autonomous vehicle in the step S211, the object to which a warning is to be transmitted may be determined as an autonomous vehicle in the step S214. As an autonomous vehicle is basically capable of communicating with the moving object, the moving object may transmit information on an event situation to the autonomous vehicle via communication and terminate the event situation by exchanging a message. Herein, each of the moving object and the autonomous vehicle may adaptively transmit information on the event situation according to each autonomous driving level. For example, both the moving object and the autonomous vehicle are at Level 4 or at Level 5, the information on event situation may be transmitted through communication between the moving objects. As another example, when the autonomous vehicle is at one of Level 0, Level 1, Level 2, and Level 3, it may be capable or incapable of communicating with the moving object. Based on this, the moving object may check first whether or not it is possible to communicate with a level of the autonomous vehicle and then, based on whether or not it is possible to communicate with the autonomous driving level, may terminate an event situation through an exchange of message or operate a warning alarm system. When the object in the step S211 is identified or determined as an object not equipped with an autonomous driving function (hereinafter, referred to as "general moving object"), the object to which a warning is to be transmitted in the step S214 may also be determined as a general moving object. A general moving object may be capable or incapable of communicating with the moving object. Based on this, the moving object may check first whether or not it is possible to communicate with a level of a general moving object and then, based on whether or not it is possible to communicate with the general moving object, may terminate an event situation through an exchange of message or operate a warning alarm system.

When the object is identified or determined as a pedestrian in the step S211, the object to which a warning is to be transmitted may be determined as a device carried by the pedestrian in the step S214. As the moving object is capable of communicating with the device carried by the pedestrian, the moving object may transmit a notification or information on an event situation to the device carried by the pedestrian. However, even when the moving object provides a notification or information on an event situation to the device carried by the pedestrian, the pedestrian may not instantly check the device. Accordingly, the moving object may confirm whether or not the notification or information on the event situation is checked by exchanging a predetermined signal or message with the above-described device. Based on this, the moving object may terminate the event situation or operate a warning alarm system.

When the object is identified or determined as an autonomous vehicle at one of Level 0, Level 1, Level 2 and Level 3, a general moving object, or a pedestrian, the moving object may recognize the object's avoiding movement, for example, the pedestrian's seeing the moving object or a change in the driving state of the general moving object (e.g., lane change, change of driving direction, change of velocity, etc.) through a camera or other sensor and thus may terminate an event situation or operate a warning alarm system.

When determining a general situation (C: S212), the moving object may drive along a set driving route (S222).

Figure 3A:
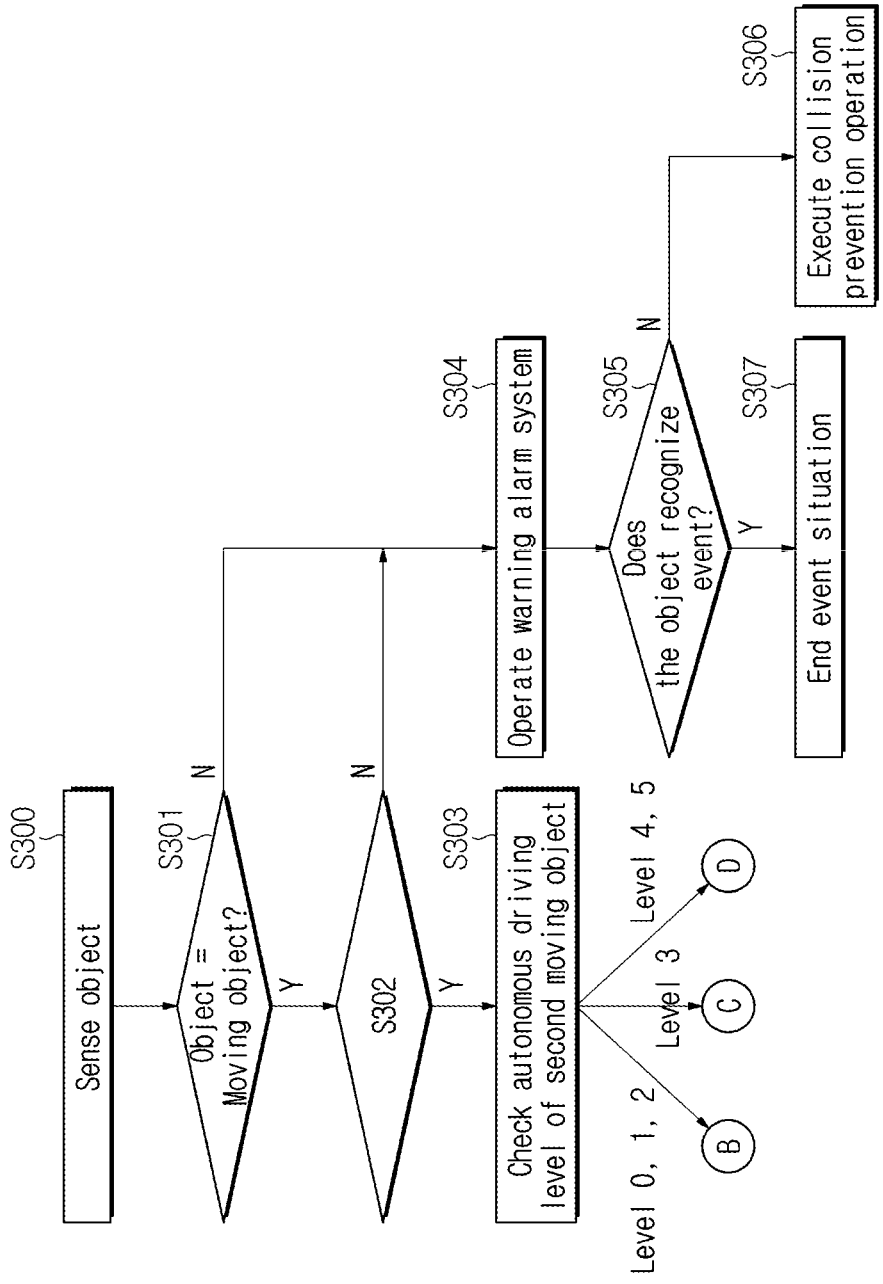
FIG. 3A is a view showing another operation method by which an autonomous vehicle detects an object and an event, according to an embodiment of the present disclosure.

FIG. 3A is a view showing another operation method by which an autonomous vehicle detects an object and an event, according to an embodiment of the present disclosure.

Referring to FIG. 3A, an autonomous vehicle (hereinafter, referred to as "first moving object") may check first whether or not there is an object in an area adjacent to the first moving object (S300). Herein, the first moving object may recognize whether or not there is an object through a camera or other sensor. In this process, the first moving object may determine a type of the object. The object may be at least one of a moving object (hereinafter, referred to as "second moving object") or a pedestrian. Moreover, the object may be an object sensed by the first moving object but is not limited to a specific object and may change variously.

When a type of the object is identified as a second moving object (YES: S301), the first moving object may check whether or not it is possible to communicate with the second moving object (S302). When it is possible to communicate with the second moving object (YES: S302), the first moving object may identify an autonomous driving level of the second moving object (S303). Next, the first moving object may execute a warning alarm operation or a collision prevention operation according to the autonomous driving level of the second moving object.

When it is impossible to communicate with the second moving object (NO: S302), the first moving object may operate the warning alarm system by considering that the second moving object is incapable of communication (S304). For example, the first moving object may selectively activate, as a warning alarm entity, at least one of a horn, a headlight, an emergency light, or an external display apparatus. Herein, the first moving object may check whether or not the object (e.g., a second moving object, a pedestrian, and any other thing) recognizes the first moving object (S305). The first moving object may recognize a movement or operation of the object through a camera or any other sensor. In addition, the first moving object may recognize that the object gets out of a travel route (e.g., a travel route set in the first moving object). When the object recognizes an event and operates as described above (YES: S305), the first moving object may detect the operation and end the event situation (S306).

On the other hand, when the object does not recognize an event (NO: S305), the first moving object may perform a collision prevention operation after determining that an accident is unavoidable (S307). Herein, the collision prevention operation may include an operation of ending the driving of the first moving object or an operation of avoiding the object and then proceeding.

Figure 3B:
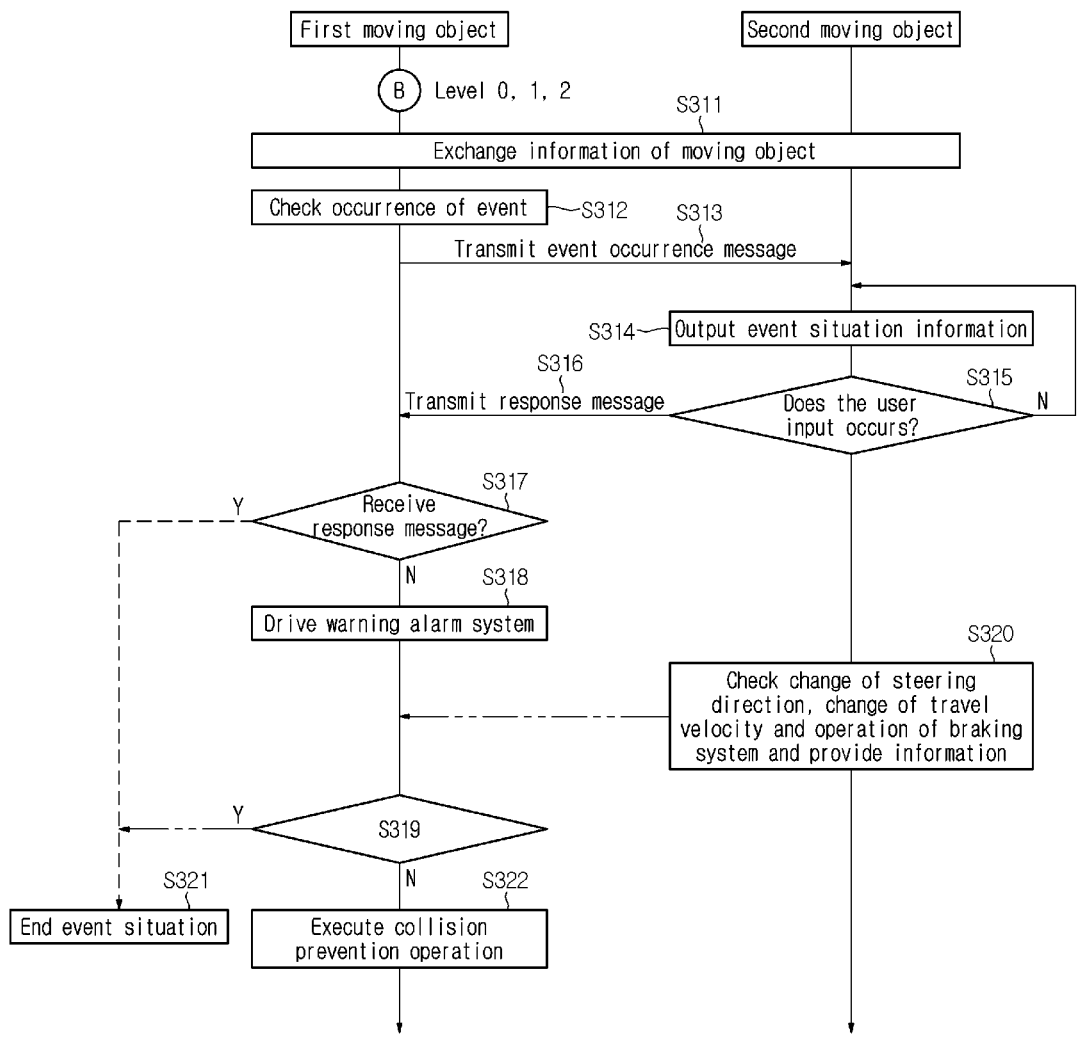
FIG. 3B illustrates a warning alarm operation or a collision prevention operation in Level 0, 1 or 2.
Figure 3C:
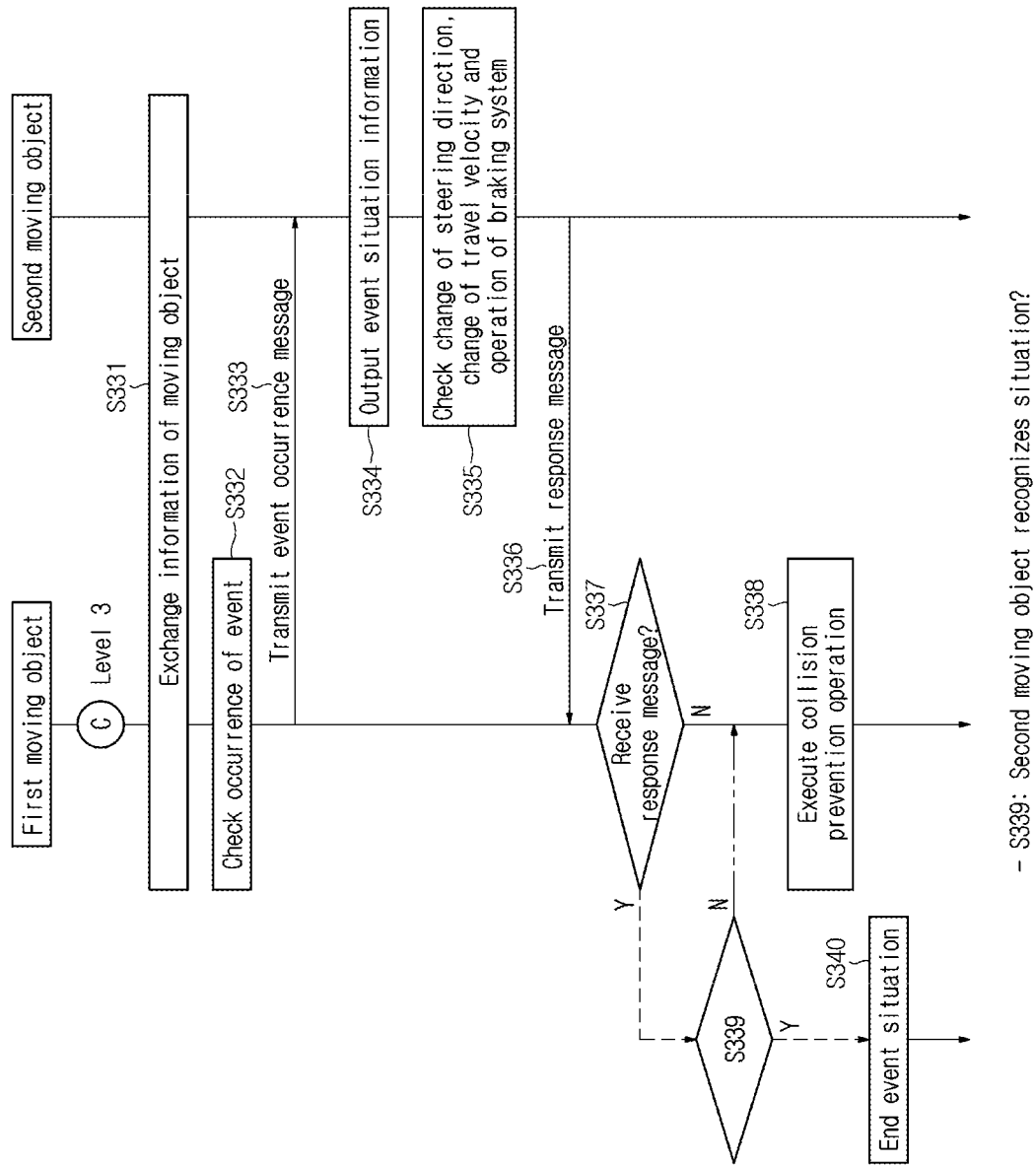
FIG. 3C illustrates a warning alarm operation or a collision prevention operation in Level 3.

FIGS. 3B to 3D are views illustrating a method of performing a warning alarm operation or a collision prevention operation according to an autonomous driving level that is identified in the step S303 of FIG. 3A.

First, FIG. 3B illustrates a warning alarm operation or a collision prevention operation in Level 0, 1 or 2.

A first moving object and a second moving object may exchange moving object information via communication (S311). Herein, the moving object information may include an identifier of the moving object, position information of the moving object (e.g., GPS-based position information, precise position information, etc.), velocity, driving direction, etc. The first moving object may confirm the occurrence of an event by using the moving object information that is exchanged with the second moving object (S312). As an example, the event may be recognition of a collision situation. As another example, the position, velocity and direction of the second moving object may be recognized through a camera, a sensor apparatus and the like installed in the first moving object, and the possibility of collision may be determined based on the position, velocity and direction of the first moving object and the position, velocity and direction of the second moving object.

Next, the first moving object may transmit an event occurrence message to the second moving object through communication (S313). Herein, the event occurrence message may include the information on event situation described in FIG. 2. In response to this, the second moving object may receive the event occurrence message and output the information on event situation included in the event occurrence message through an output apparatus (e.g., a display apparatus, a navigation apparatus, an information display apparatus, etc.) installed in the second moving object (S314). Furthermore, the second moving object may provide an environment in which whether or not the information on event situation that is output through the output apparatus may be input, and may confirm whether or not a user input occurs through the environment (S315). The output apparatus may configure and provide a predetermined UI capable of processing a user input, and the user input may be confirmed through the UI. The second moving object may confirm whether or not a user input occurs through at least one input button installed in it. The second moving object may configure a response message for the event occurrence message depending on whether or not the user input occurs and may provide the response message to the first moving object (S316). When the user input does not occur, the second moving object may not transmit the response message. In response to this, when the response message is not received (NO: S317), the first moving object may drive a warning alarm system (S318). Even when the response message is received, if it is received after the first moving object and the second moving object collide with each other, receiving the response message may be useless. With this being considered, the first moving object may count a time after transmitting the event occurrence message. When the counted time exceeds a predetermined time, the first moving object may determine that no response message is received.

In the step S318, the first moving object may selectively drive at least one of a horn, a head light, an emergency light, or an external display, as a warning alarm entity. The first moving object may confirm whether or not the second moving object has recognized the first moving object (S319). The first moving object may recognize an avoiding motion of the second moving object through a camera or any other sensor. In addition, the first moving object may recognize that the second moving object gets out of a travel route. The second moving object may confirm changes like a change in steering direction, a change in travel velocity, a change in the operation of braking system, and the like, and may transmit the information thus confirmed to the first moving object (S320). In response to this, the first moving object may confirm that the second moving object recognizes an event.

When it is confirmed that the second moving object recognizes an event (YES: S317), the first moving object may detect the operation and end the event situation (S321).

On the other hand, when the second object does not recognize an event (NO: S319), the first moving object may perform a collision prevention operation after determining that an accident is unavoidable (S322). The collision prevention operation may include an operation of ending the driving of the first moving object or an operation of bypassing the second moving object and then proceeding.

FIG. 3C illustrates a warning alarm operation or a collision prevention operation in Level 3. As described above, Level 3 may be a level that is set to enable a system to execute every driving operation under some driving conditions and a driver to start or restart driving in an emergency situation.

Likewise, the first moving object and the second moving object may exchange moving object information via communication (S331). Herein, the moving object information may include an identifier of the moving object, position information of the moving object (e.g., GPS-based position information, precise position information, etc.), velocity, driving direction, etc. The first moving object may confirm the occurrence of an event by using the moving object information that is exchanged with the second moving object (S332). As an example, the event may be recognition of a collision situation. As another example, the position, velocity and direction of the second moving object may be recognized through a camera, a sensor apparatus and the like installed in the first moving object, and the possibility of collision may be determined based on the position, velocity and direction of the first moving object and the position, velocity and direction of the second moving object.

Next, the first moving object may transmit an event occurrence message to the second moving object through communication (S333). Herein, the event occurrence message may include the information on event situation described in FIG. 2. In response to this, the second moving object may receive the event occurrence message and output the information on event situation included in the event occurrence message through an output apparatus (e.g., a display apparatus, a navigation apparatus, an information display apparatus, etc.) installed in the second moving object (S334).

In response to this, the second moving object may confirm changes like a change in steering direction, a change in travel velocity, a change in the operation of braking system, and the like (S335). The second moving object may also configure a response message including the information thus confirmed and transmit the message to the first moving object (S336).

When no change occurs in steering direction, travel velocity and operation of braking system, the second moving object may not transmit a response message. In response to this, when no response message is received (NO: S337), the first moving object may determine that the second moving object does not recognize an event and that an accident is unavoidable. In response to this, the first moving object may execute a collision prevention operation (S338). Herein, the collision prevention operation may include an operation of ending the driving of the first moving object or an operation of bypassing the second moving object and then proceeding.

Furthermore, even when a response message is received, if it is received after the first moving object and the second moving object collide with each other, receiving the response message may be useless. With this being considered, in the step S337, the first moving object may count a time after transmitting the event occurrence message. When the counted time exceeds a predetermined time, the first moving object may determine that no response message is received.

When a response message is received (YES: S337), the first moving object may confirm the response message and end an event situation (S340). The first moving object may check information included in a response message, for example, changes in the second moving object like a change in steering direction, a change in travel velocity, a change in the operation of braking system and the like, and based on the information, may execute an additional operation for checking whether or not the second moving object recognizes the situation (S339). When it is determined that the second moving object recognizes the situation (YES: S339), the first moving object may execute an operation of ending the event situation. When it is determined that the second moving object does not recognize situation (NO: S339), the first moving object may execute a collision prevention operation.

Although an embodiment of the present disclosure illustrates information included in a response message, the present disclosure is not limited to the embodiment and the information included in a response message may be modified in various ways. In addition, in response to information included in a response message, the operation of a first moving object or a second moving object may also be modified in various ways. The second moving object may determine that an avoidance operation is completed based on a change in steering direction, a change in travel velocity and a change in the operation of braking system. In addition, the second moving object may include information on whether or not an avoidance operation is completed in a response message and may transmit the information. In response to this, the first moving object may determine whether or not the second moving object recognizes the situation.

FIG. 3D illustrates a warning alarm operation or a collision prevention operation in Level 4 or Level 5.

The first moving object and the second moving object may exchange moving object information via communication (S351). The moving object information may include an identifier of the moving object, position information of the moving object (e.g., GPS-based position information, precise position information, etc.), velocity, driving direction, etc. The first moving object may confirm the occurrence of an event by using the moving object information that is exchanged with the second moving object (S352). As an example, the event may be recognition of a collision situation. As another example, the position, velocity and direction of the second moving object may be recognized through a camera, a sensor apparatus and the like installed in the first moving object, and the possibility of collision may be determined based on the position, velocity and direction of the first moving object and the position, velocity and direction of the second moving object.

Next, the first moving object may transmit an event occurrence message to the second moving object through communication (S353). Herein, the event occurrence message may include the information on event situation described in FIG. 2. In response to this, the second moving object may receive the event occurrence message and output the information on event situation included in the event occurrence message through an output apparatus (e.g., a display apparatus, a navigation apparatus, an information display apparatus, etc.) installed in the second moving object (S354). In addition, the second moving object may control a steering direction, an accelerator and a braking system of the second moving object by considering information included in information on an event situation like the position, velocity and direction of the first moving object and the position, velocity and direction of the second moving object (S355). In addition, the second moving object may configure a response message including control information for a steering direction, an accelerator and a braking system of the second moving object and may transmit the response message to the first moving object (S356).

The second moving object may not transmit a response message. In response to this, when no response message is received (NO: S357), the first moving object may determine that the second moving object does not recognize an event and that an accident is unavoidable. In response to this, the first moving object may execute a collision prevention operation (S358). Herein, the collision prevention operation may include an operation of ending the driving of the first moving object or an operation of bypassing the second moving object and then proceeding.

Furthermore, even when a response message is received, if it is received after the first moving object and the second moving object collide with each other, receiving the response message may be useless. With this being considered, in the step S357, the first moving object may count a time after transmitting the event occurrence message. When the counted time exceeds a predetermined time, the first moving object may determine that no response message is received.

When a response message is received (YES: S357), the first moving object may confirm the response message and end an event situation (S360). The first moving object may check information included in a response message, for example, control information for a steering direction, an accelerator and a braking system in the second moving object, and based on the information, may execute an additional operation for checking whether or not the second moving object recognizes the situation (S359). When it is determined that the second moving object recognizes the situation (YES: S359), the first moving object may execute an operation of ending the event situation. When it is determined that the second moving object does not recognize situation (NO: S359), the first moving object may execute a collision prevention operation.

Although an embodiment of the present disclosure illustrates information included in a response message, the present disclosure is not limited to the embodiment and the information included in a response message may be modified in various ways. In addition, in response to information included in a response message, the operation of a first moving object or a second moving object may also be modified in various ways. The second moving object may include information indicating that an avoidance operation is completed in a response message and may transmit the information. In response to this, the first moving object may determine whether or not the second moving object recognizes the situation.

Figure 4A:
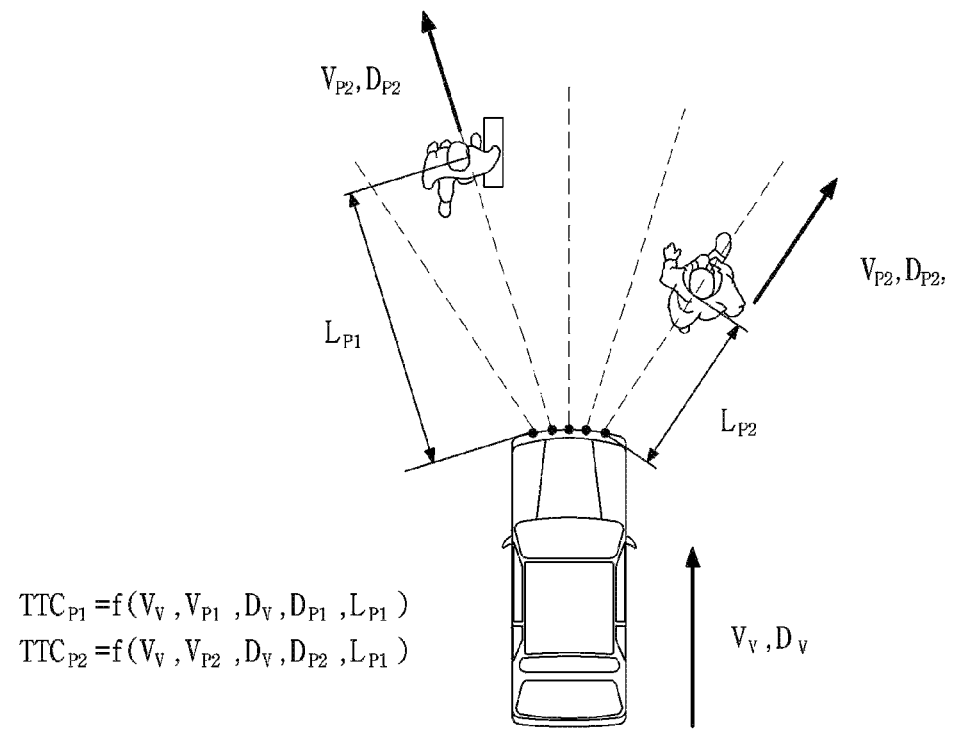
FIG. 4A is a view showing a method for checking a distance between a moving object and a pedestrian according to an embodiment of the present disclosure.

FIG. 4A is a view showing a method for checking a distance between the moving object and a pedestrian according to an embodiment of the present disclosure.

Referring to FIG. 4A, the moving object detects an object by the method. Herein, as described above, the object may be at least one of an autonomous vehicle, the moving object, or a pedestrian. The moving object may detect an object based on a time to collision (TTC) value. Herein, TTC may be calculated based on a velocity of the moving object, a direction of the moving object, a velocity of the object, a direction of the object, and a distance between the moving object and the object. In FIG. 4A, the TTC value between the moving object and Pedestrian 1 may be calculated based on Equation 1 below. The TTC value may be calculated based on a function for a velocity of the moving object, a direction of the moving object, a velocity of the object, a direction of the object, and a distance between the moving object and the object. Herein, the moving object may determine the possibility of a collision based on the TTC value. When the TTC value is smaller than a threshold value, the moving object may detect that a collision occurs. That is, when the TTC value is smaller than a threshold value, the moving object may detect that an emergency situation occurs, as described above.

$$TTC_{P1} = f(V_V, V_{P1}, D_V, D_{P1}, L_{P1})  \quad \text{Equation 1}$$

Here, $TTC_{P1}$ represents a TTC value between the moving object and a first object, $V_V$ represents a travel velocity of the moving object, $V_{F1}$ represents a travel velocity of the first object, $D_V$ is a movement direction of the moving object, $D_{F1}$ is a movement direction of the first object, and $L_{P1}$ represents a distance between the moving object and the first object.

Figure 4B:
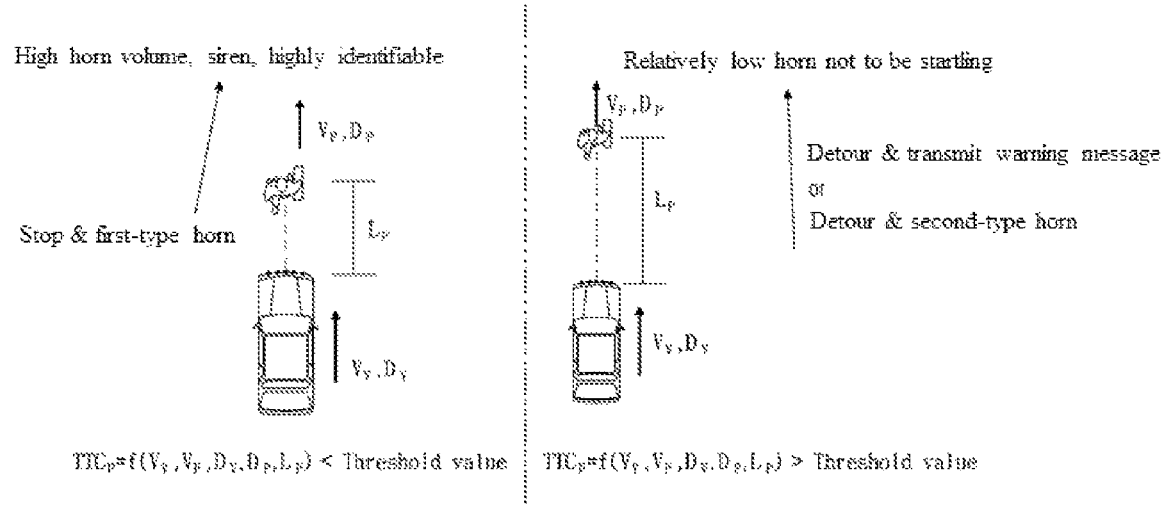
FIG. 4B is a view showing a method for comparing a distance between a moving object and a pedestrian with a threshold value according to an embodiment of the present disclosure.

FIG. 4B is a view showing a method for comparing a distance between the moving object and a pedestrian with a threshold value according to an embodiment of the present disclosure.

In addition, the moving object may control an operation of the moving object based on a TTC value. As described above, it is possible to consider a case in which a TTC value is smaller than a threshold value. In this case, the moving object may detect an emergency situation and end the driving of the moving object based on the detection. In addition, the moving object may operate a warning alarm system while ending the driving. Herein, the warning alarm system may automatically operate based on the moving object. A first-type horn may be output in the case described above. The first-type horn may be a horn sound greater than a reference value and be a horn that is readily perceived. The output value of a horn sound can be manually adjusted by a driver in a conventional moving object. However, the horn sound needs to be differently provided according to the situation of the moving object. In addition, instead of being manually provided by a driver, the horn sound needs to be automatically provided as the moving object itself determines an emergency situation. With this being considered, when a TTC value is smaller than a threshold value, the moving object may provide a horn that is much more perceivable than a reference value as a first-type horn, thereby enabling an object (or pedestrian) to easily recognize the possibility of collision.

It is possible to consider a case in which a TTC value is greater than a threshold value. More specifically, it is possible to consider a case in which a TTC value is greater than a first threshold value but smaller than a second threshold value. That is, it may a case in which there might be a possibility of collision between the moving object and an object but the moving object is capable of avoiding the collision by itself and a measure considering an emergency situation is possible enough. The moving object may execute bypass driving by avoiding the object. That is, since there is a sufficient time for controlling an operation of the moving object based on a TTC value, the moving object may drive by bypassing the object. The moving object may transmit a warning message for the possibility of collision to the object. As described above, when the object is an autonomous vehicle or the moving object capable of receiving a message, the moving object may control the collision by means of the above-described message. The moving object may provide a second-type horn to the object. However, unlike the first-type horn, the second-type horn may be output with a volume smaller than a reference value. In addition, since a situation may not be an emergency situation, a horn sound may need to have a volume enough to be perceivable to an object but not to be larger. That is, the moving object may determine whether or not a collision is probable based on a TTC value and thus may provide different types of horn sound, thereby controlling an operation mode of the moving object.

Figure 5A:
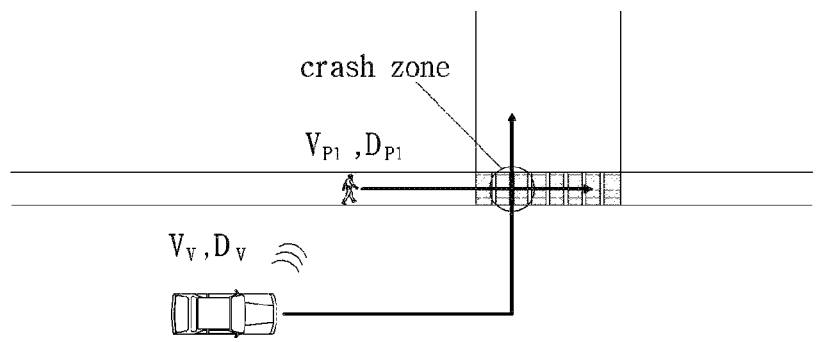
FIGS. 5A, 5B and 5C are views showing a method for checking a collision between a moving object and a pedestrian according to an embodiment of the present disclosure.
Figure 5B:
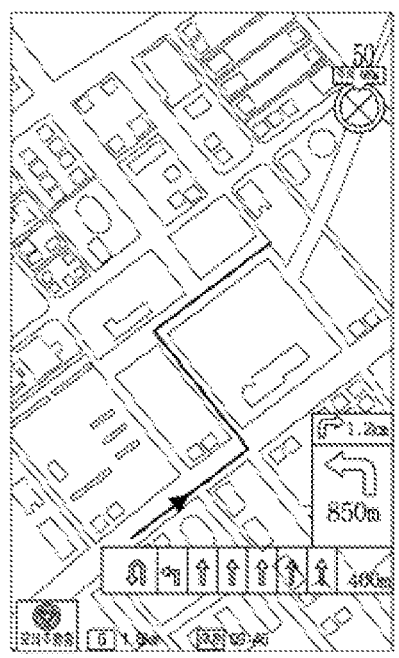
Figure 5C:
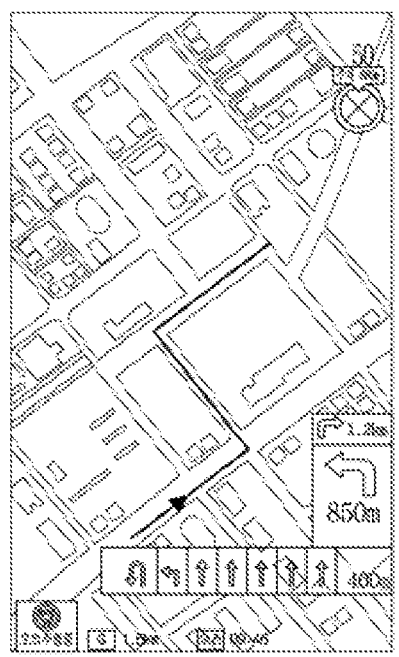

FIGS. 5A, 5B, and 5C are views showing a method for checking a collision between a moving object and a pedestrian according to an embodiment of the present disclosure.

The moving object may calculate a collision with an object. More specifically, in the above description, the moving object was capable of detecting an object that moved in the same direction or the opposite direction to the moving object. However, an emergency situation between the moving object and an object may be frequently unpredictable or occur in a blind spot.

Referring to FIG. 5A, the moving object may collide with a pedestrian while driving along a route and turning left. Herein, as the travel direction of the moving object changes, the moving object may not be able to recognize the pedestrian and thus the probability of an accident may be high. With this being considered, the moving object may detect an object by considering a travel route. Referring to FIGS. 5B and 5C, the moving object may have a preset travel route based on a navigation system. The moving object may sense an object based on the travel route according to a driving direction of the moving object. That is, instead of detecting an object in all directions, the moving object may sense an object within a range, in which there is a possibility of collision, by considering a driving direction of the moving object. Herein, the moving object may sense an object based on its driving direction and display sensed information in a navigation system. In addition, the moving object may sense an object based on its driving direction and transmit a warning message to the sensed object. The object may be capable or incapable of communication as described above. When the object is capable of communication, the moving object may detect the possibility of collision via a communication with the object and may execute detour driving or operation mode control based on the possibility of collision. On the other hand, when the object is incapable of communication, the moving object may not be able to transmit a warning message to the object with collision risk. Accordingly, the moving object may control driving by itself. As an example, the moving object may adjust velocity. In addition, the moving object may enable the object to recognize the moving object through horn based on a warning alarm system, as described above. That is, the moving object may detect an object with the possibility of an accident based on its travel route and may execute a collision prevention operation based on the object's capability of communication.

Figure 5D:
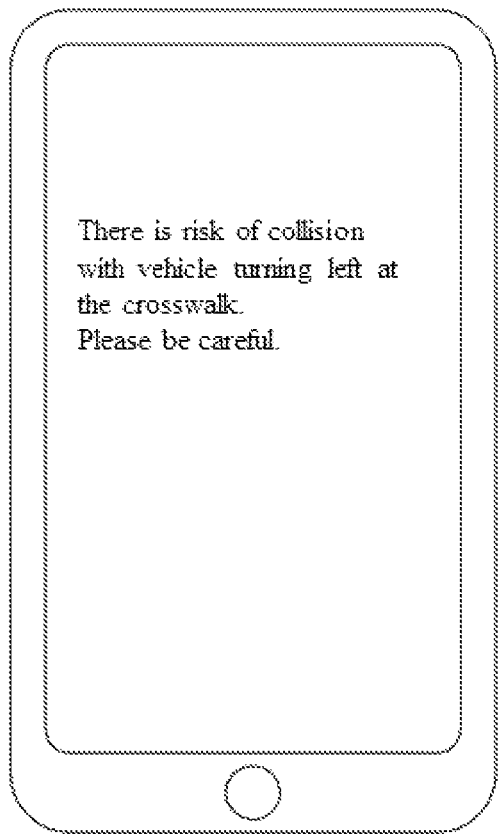
FIG. 5D is a view showing a method for providing information on collision possibility through a device of an object according to an embodiment of the present disclosure.

Referring to FIG. 5D, when an object is a pedestrian, information on the possibility of a collision (or an event) may be provided through a device of the object. Specifically, the moving object may identify an object as a pedestrian by analyzing a form or shape of the object that is sensed within a range, in which there is a possibility of a collision, by considering a travel direction of the moving object. In addition, the moving object may check the position information of the device (e.g., portable terminal) carried by the pedestrian and may check a situation between the moving object and the object based on the position information of the device. The situation between the moving object and the object may include an emergency situation, a manageable situation, and a general situation. The emergency situation, a situation in which a collision between the moving object and an object is expected, illustrates an unavoidable situation based on a preset threshold value for collision possibility, the manageable situation, a situation in which the moving object is capable of driving by avoiding the object, illustrates a situation in which a threshold value is greater than or equal to a first threshold value and less than a second threshold value, and the general situation, a situation in which no collision occurs between the moving object and the object, illustrates a situation in which the possibility of a collision is greater or equal to the second threshold value or no event is detected.

Furthermore, the moving object may provide information on the possibility of a collision (or an event) through a device (e.g., a portable terminal) of a pedestrian. When the object is identified as a pedestrian, the moving object may capture a region, in which the object is located, through a camera apparatus installed in the front of the moving object and analyze an image thus captured, thereby determining whether or not the pedestrian is seeing the device (e.g., portable terminal). The moving object may perform a connection with the device (e.g., portable terminal) through communication like V2X and V2D and determine whether or not the pedestrian is seeing the device (e.g., portable terminal) based on the display On/Off state.

When the object is a moving object, the object may provide driving information for the moving object with collision possibility through an external display apparatus and thus may be able to avoid the collision.

Figure 6A:
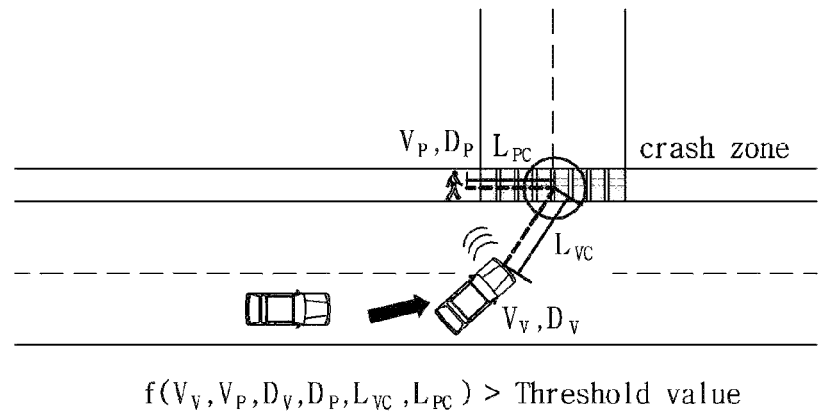
FIGS. 6A and 6B are views showing a method for checking a collision between a moving object and a pedestrian according to an embodiment of the present disclosure.
Figure 6B:
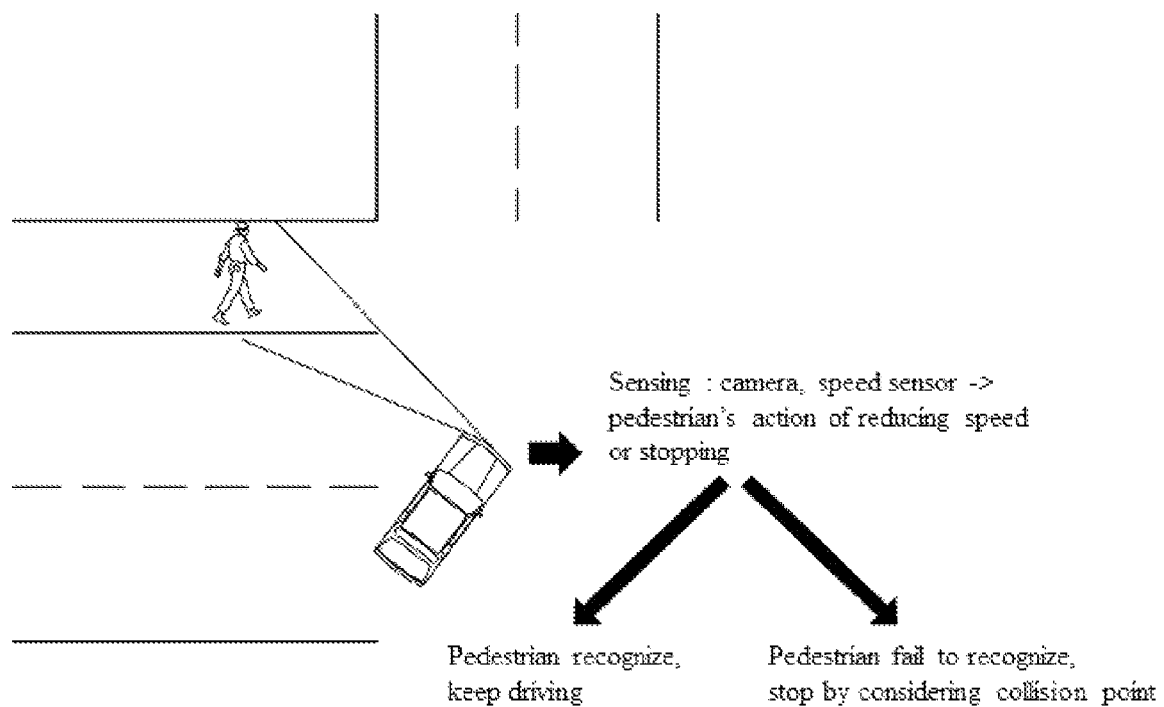

FIGS. 6A and 6B are views showing a method for checking a collision between a moving object and a pedestrian according to an embodiment of the present disclosure.

In addition, referring to FIG. 6A, the moving object may determine a possibility of a collision for an object that is moving in a different direction. The possibility of a collision may be determined through a function based on Equation 2 below.

$$\text{Possibility of collision} = f(V_V, V_P, D_V, D_P, L_{VC}, L_{PC}) \quad \text{Equation 2}$$

Here, $V_V$ represents a travel velocity of the moving object, $V_P$ represents a travel velocity of the object, $D_V$ is a movement direction of the moving object, $D_F$ is a movement direction of the object, and $L_P$ represents a distance between the moving object and the object.

More specifically, a possibility of a collision may be derived through a function having variables of a velocity of the moving object, a velocity of an object, a direction of the moving object, a direction of the object, a distance from a crash point to the moving object and a distance from the crash point to the object. That is, the moving object may calculate an expected crash point by considering the velocity and direction of the moving object and the velocity and direction of an object and may make a determination about the possibility of a collision based on the expected crash point. The possibility of the collision may be compared with a threshold value. Herein, the possibility of the collision may be a value corresponding to a TTC value. When the value is smaller than a threshold value, the moving object may sense the occurrence of the collision.

Referring to FIG. 6B, the moving object may detect an object through a camera or other sensor. The moving object may acquire information on an object through navigation or map information and may acquire information on velocity and direction based on the position information of the object. The moving object may further detect a movement of the object after detecting the object. The object may perform an action of recognizing the moving object and reducing the velocity or stopping. The moving object may confirm that the object perceives the moving object driving and may keep driving based on a driving direction. On the other hand, when the object keeps failing to recognize the moving object and the above-described possibility value of collision becomes smaller than a threshold value, the moving object may prevent the collision by reducing its travel velocity or by stopping. That is, the moving object may drive while identifying the possibility of a collision through the above-described method.

Figure 7:
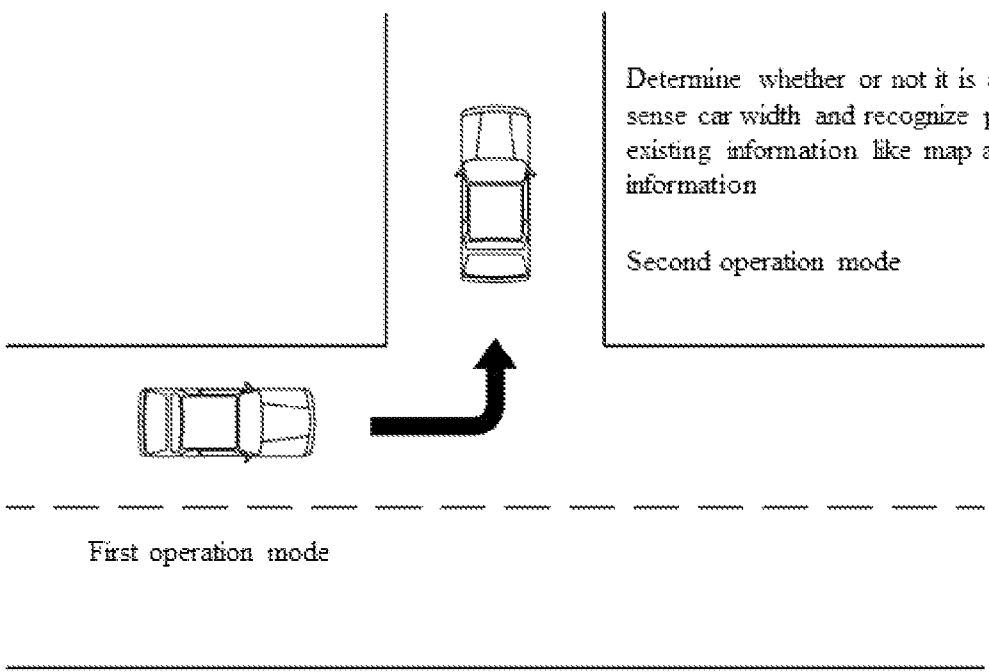
FIG. 7 is a view showing a method for controlling an operation mode of a moving object based on a back road according to an embodiment of the present disclosure.

FIG. 7 is a view showing a method for controlling an operation mode of a moving object based on a back road according to an embodiment of the present disclosure.

Based on what is described above, the moving object may detect an object and avoid a collision based on a warning alarm system. The moving object recognized the object through a sensor and the like and determined a possibility to avoid a collision based on a TTC value and the like.

Based on an operation mode of the moving object, a different method of sensing an object may be set. When the moving object drives on a general road, the moving object may operate based on a first operation mode. When the moving object drives on a back lane, the moving object may operate in a second operation mode. More specifically, when the moving object drives on a general road (first operation mode), the moving object may drive based on the recognition of lanes on the road, a communication with another moving object, or a communication with an intelligent traffic system. Herein, the moving object may have a relatively low possibility of collision or accident unless there is a cause attributable to a driver like speeding or driving while intoxicated. However, a back lane may be a narrow lane where there is no clear distinction between sidewalk and road. A back lane may have no centerline and no uniform direction of running cars. Accordingly, the moving object may have a high possibility of collision in a back lane. The moving object may drive on a general road based on a first operation mode and may operate on a back lane based on a second operation mode. A method of detecting a back lane may be required for the moving object. For example, the moving object may sense a back lane through map information or navigation information. In addition, the moving object may determine whether or not a road is a back lane by recognizing a width of a car, a width of the road or a pedestrian. That is, the moving object may determine whether or not the moving object is running on a back lane through a sensor installed in the moving object. The moving object may differently a sensing method for an object in each mode. As an example, in the first operation mode of driving on a general road, the moving object may drive with other moving objects and control driving based on an intelligent traffic system. Accordingly, when the moving object operates in the first operation mode, the moving object may recognize a neighbor object through a mutual exchange of signals between moving objects. In addition, the moving object may detect an object based on an intelligent traffic system installed at a crosswalk or an intersection, which will be described below. On the other hand, when the moving object operates in the second operation mode, the moving object may detect an object by being connected to a personal device of a pedestrian. The moving object may detect an object through a neighbor intelligent traffic system, which will be described below.

That is, when the moving object senses a collision and honks a horn or avoids the collision, different modes may be set based on a road on which the moving object is running. Herein, different methods of recognizing an object may be set in order to determine the possibility of collision based on a mode of the moving object.

Figure 8:
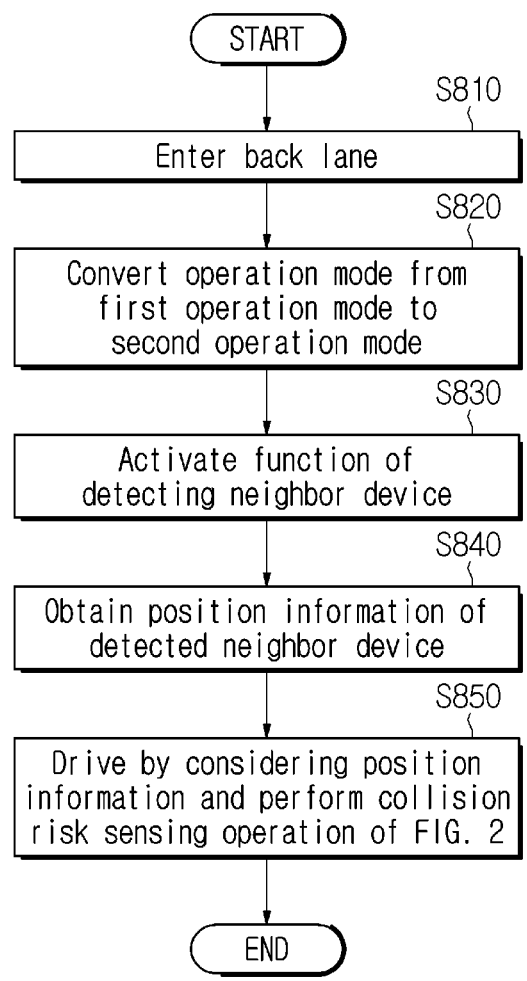
FIG. 8 is a flowchart for a method for controlling an operation mode of a moving object based on a back road according to an embodiment of the present disclosure.

FIG. 8 is a flowchart for a method for controlling an operation mode of a moving object based on a back road according to an embodiment of the present disclosure.

As described above, the moving object may differently set a method of detecting an object according to a driving mode. Herein, a driving mode may be differently set according to a road on which the moving object is driving. More specifically, it is possible to consider a case in which the moving object drives on a general road. The moving object may operate based on the first operation mode. The moving object may detect that it is entering a back lane (S810). The moving object may confirm that it enters the back lane through map information or navigation information. Based on position information, the moving object may identify its position in map information or navigation information, and based on road information that is already stored, may check whether or not the moving object is located on a general road or a back lane. A device for confirming map information, driving the navigation system or confirming position information may be configured in various ways. The device may be configured as at least one or a combination of two or more among a device installed inside the moving object, a device of a user in the moving object, and a server apparatus connected through a communication with the moving object.

The moving object may check whether or not it is a back lane through information that is sensed by a sensor installed in the moving object. The moving object may check whether or not it is on a back lane based on a width of a car, a width of the road, or whether or not there is a pedestrian. That is, the moving object may detect a back lane based on various methods but is not limited to the above-described embodiment.

Next, when the moving object detects a back lane, the moving object may be converted from the first operation mode to the second operation mode (S820). Herein, the moving object may detect an object based on a different method from the first operation mode. When the moving object is converted into the second operation mode, the moving object may activate a function of detecting a neighbor device (S830). When the moving object operates in the first operation mode, the moving object may recognize an object by exchanging a signal with another moving object running on a road and an intelligent traffic system and thus there is no necessity to activate the function of detecting a neighbor device. In addition, when the power consumption of the moving object or a relation with other systems, it is not necessary to activate the above-described function in the first operation mode.

On the other hand, when the moving object operates based on the second operation mode, since the moving object is driving on a back lane, it is necessary to detect various objects. There may be general objects on the back lane and there may also be another moving object or a pedestrian carrying a device. When the moving object drives on a back lane, since the possibility of a collision with a pedestrian or another moving object may be high, the moving object may need to have a method of detecting an object on the back lane. Accordingly, when entering a back lane, the moving object may activate a function of detecting a neighbor device and obtain position information of the neighbor device (S840). It is possible to consider a method of the moving object for obtaining the position information of the neighbor device. When a neighbor device agrees to provide position information and the moving object is capable of identifying the position information or object information of the device, the moving object may detect an object based on the position information or object information of the neighbor device. Herein, the moving object may identify the position information or object information of the neighbor device by at least one or a combination of two or more among a camera installed on a back lane, an intelligent traffic system, a device installed inside the moving object, a device of a user in the moving object, and a server apparatus connected through a communication with the moving object.

On the other hand, when there is a device that does not agree to provide position information among neighbor devices or for a neighbor device incapable of communication, the moving object may sense through a sensor by itself. The moving object may sense an object located within a predetermined distance from the moving through a camera or other sensor mounted on the moving object and may check the possibility of a collision based on the sensed object. That is, the moving object may identify an object, of which the position is identifiable, based on a communication function or may identify the object through direct sensing. Next, the moving object may execute an operation of detecting a collision risk by considering the position information of objects. The moving object may perform collision risk (or emergency situation) detection based on FIG. 2 described above (S850). That is, the moving object may determine a possibility of a collision based on the detection of an object by considering whether or not it is an emergency situation with the possibility of the collision, whether or not detour driving is possible by avoiding the collision, and whether or not the object recognizes the risk, as described above.

Figure 9A:
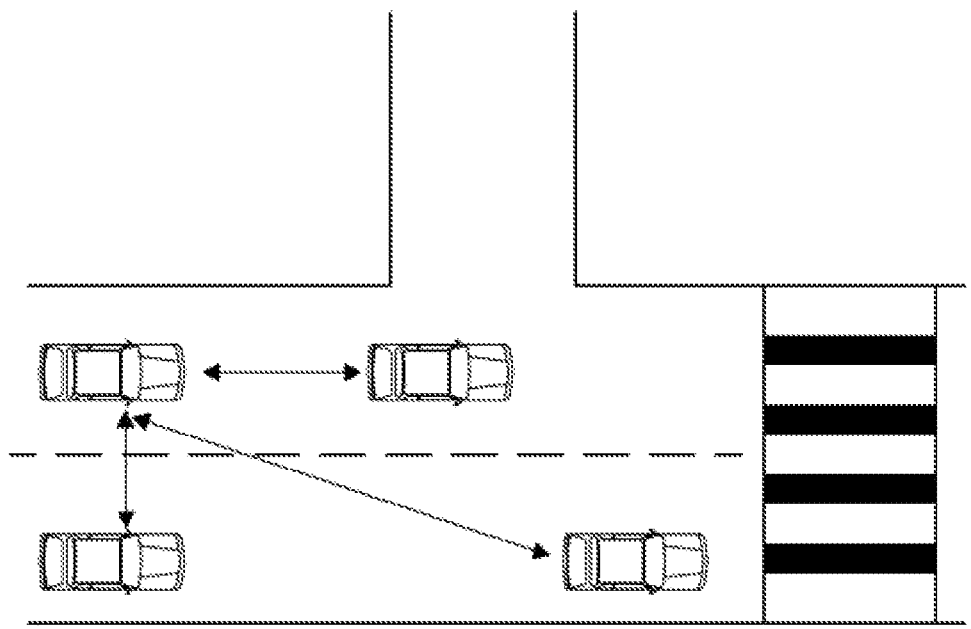
FIGS. 9A and 9B are views showing a method for controlling a moving object in a first operation mode and in a second operation mode according to an embodiment of the present disclosure.
Figure 9B:
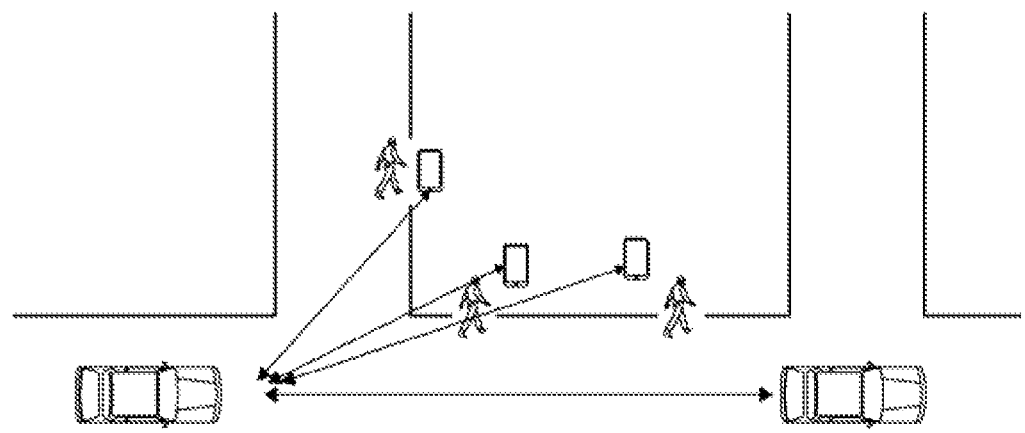

FIGS. 9A and 9B are views showing a method for controlling a moving object in a first operation mode and in a second operation mode according to an embodiment of the present disclosure.

Referring to FIG. 9A, the moving object may operate based on the first operation mode and detect an object. The first operation mode may be an operation mode in a case where the moving object is driving on a general road. The general road may refer to a road in which the travel directions of moving objects are predetermined and the moving objects can run along lanes. The moving object may collide with a neighbor moving object on a general road. In addition, the moving object may collide with a pedestrian at a crosswalk or an intersection. With what is described being considered, the moving object may operate based on the first operation mode on a general road. When the moving object operates on the first operation mode, the moving object may identify relative positions via communication with neighbor moving objects. The moving object may identify the position information of a neighbor moving object through map information or navigation information. Herein, a device for confirming map information, driving the navigation system or confirming position information may be configured in various ways. The device may be configured as at least one or a combination of two or more among a device installed inside the moving object, a device of a user in the moving object, or a server apparatus connected through a communication with the moving object. In addition, the moving object may detect another moving object located within a predetermined distance through a sensor mounted on it. Among moving objects running on a general road, some moving objects may be capable of communication, and other objects may not be capable of communication. Accordingly, the moving object may be able to identify the positions of most moving objects through mutual communication. However, for other moving objects incapable of communication, the moving object needs to identify their positions by itself. With this being considered, the moving object may detect a neighbor moving object located within a predetermined distance through a sensor. In addition, the moving object may detect a neighbor moving object and a pedestrian based on information that is received through an intelligent traffic system. For example, when the moving object runs at a crosswalk or an intersection, it may communicate with an intelligent traffic system installed at the position. The moving object may receive information on the crosswalk or the intersection from the intelligent traffic system. The information on the crosswalk or the intersection may include retention time of traffic signals or intersection information. Herein, the moving object may detect a neighbor object based on information received from the intelligent traffic system. The moving object may sense an object for a crosswalk during a retention time and a buffer time of a traffic light in order to prevent an accident. The moving object may detect an object around a crosswalk from a preset time (+a) before a pedestrian signal turns on to a preset time (+a) after the pedestrian signal turns off at a crosswalk. That is, the moving object may detect a pedestrian. In addition, at a crosswalk, the moving object may detect a neighbor moving object and a pedestrian through information received from an intelligent traffic system installed at the crosswalk. The moving object may confirm information on a signal retention time of a crosswalk through an intelligent traffic system. The moving object may detect neighbor objects through a sensor by using driving information of the moving object and crosswalk information. That is, when the moving object drives in the first operation mode, it may detect only a neighbor moving object during general driving but may perform a further detecting operation by considering the possibility of a collision at a crosswalk or an intersection, thereby enabling an object to be sensed.

In addition, referring to FIG. 9B, when the moving object operates in the second operation mode, the moving object may detect a neighbor object by being connected to a personal device. As described above, a back lane may refer to a road in which the width is narrow and the driving direction is not uniform. In addition, the back lane may refer to a road in which a pedestrian and the moving object exist together. When the moving object drives and operates in the second operation mode, the moving object may detect neighbor devices as described above. When neighbor devices agree to provide position information, the moving object may identify the positions of the neighbor devices through map information or navigation information. In addition, the moving object may detect a neighbor device or an object through a mounted sensor, as described above. That is, unlike in the first operation mode, the moving object may detect neighbor objects by itself and thus determine a possibility of a collision. In addition, when determining a possibility of a collision, a threshold hold may be differently set. In the case of the back lane, the possibility of a collision may be higher by considering a density with a pedestrian. In addition, the back lane may be affected by a road condition more than a general road. In midwinter, the back lane may have a worse freezing condition than a general road. In addition, the upper speed limit of the back lane may be lower than the upper speed limit of a general road. That is, the condition of the back lane may be different from the condition of a general road. With this being considered, when the moving object drives on the back lane, the moving object may determine a possibility of a collision differently from on a general road. Herein, as an example, a threshold value for possibility of collision may be lowered. In addition, as an example, when a possibility of a collision is determined, it was determined based on a TTC value above but further information may be used for the determination. When the moving object determines a possibility of a collision on the back lane, information on a blind spot may be additionally considered. The moving object may reduce velocity and be prepared for a possibility of a collision, even when an object at a blind spot is not sensed. In addition, the moving object may adjust velocity by itself by considering a possibility of a collision in the second operation mode, increase a sensing sensitivity, and control the possibility of the collision on the back lane based on what is described. Moreover, in an embodiment of the present disclosure, the moving object may be an autonomous vehicle that is controlled based on data sensed by at least one sensor. Based on this, a region that is not sensed by the position, structure and physical feature of at least one sensor may be set as a blind spot. Although, in an embodiment of the present disclosure, the blind spot is set by considering an autonomous vehicle, it is not limited by the present disclosure but may be modified in various ways. In an embodiment of the present disclosure, the moving object may include a general moving object that is not controlled by an autonomous driving system but by a user's (or a driver's) behavior. In this case, the term "blind spot" may be construed as a term conventionally used in the art.

Figure 10:
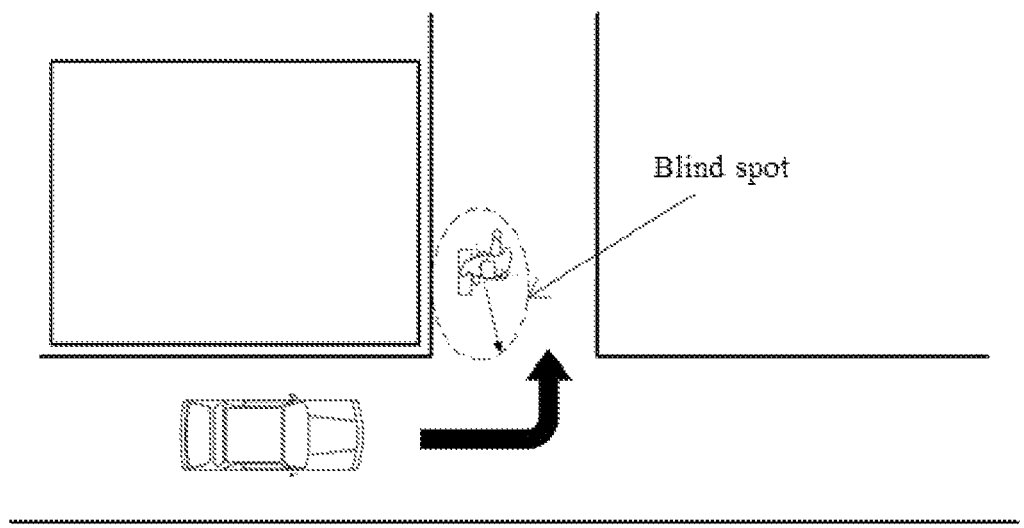
FIG. 10 is a view showing a method for controlling an operation of a moving object by considering a blind spot of a back road according to an embodiment of the present disclosure.

As another example, when an object at the blind spot (refer to FIG. 10) is sensed, the moving object may notify the situation through an external display apparatus and adjust velocity by itself. The moving object may prepare itself for a collision at a blind spot based on a device carried by a pedestrian. In addition, the moving object may activate a function of detecting a device, obtain the position information of the device thus detected and confirm whether or not there is an object at the blind spot based on the position information thus obtained. Based on V2X, V2D and V2P communication methods, the moving object may transmit a predetermined signal to a device existing within a predetermined range around the moving object and detect a neighbor device based on the reception of a corresponding response signal. Based on a neighbor device detected through such an operation, it may be confirmed whether or not there is an object at a blind spot. The moving object may identify the position information or object information of a neighbor device by at least one or a combination of two or more among a camera installed on a back lane, an intelligent traffic system, a device installed inside the moving object, a device of a user in the moving object, and a server apparatus connected through a communication with the moving object. In addition, based on the position information or object information thus identified, the moving object may confirm whether or not there is an object at a blind spot.

Moreover, the moving object may produce information on accident risk by checking position information of a back lane and considering the number of accidents, the occurrence time of accidents, a road width, temperature, whether or not it is a blind spot, and a possibility of a collision at the position. Herein, the production of the information of accident risk may be performed by at least one or a combination of two or more among the moving object, an intelligent traffic system or a server apparatus connected to the intelligent traffic system. In addition, the production of the information of accident risk may be performed by machine learning using various factors as input or output data.

Figure 11:
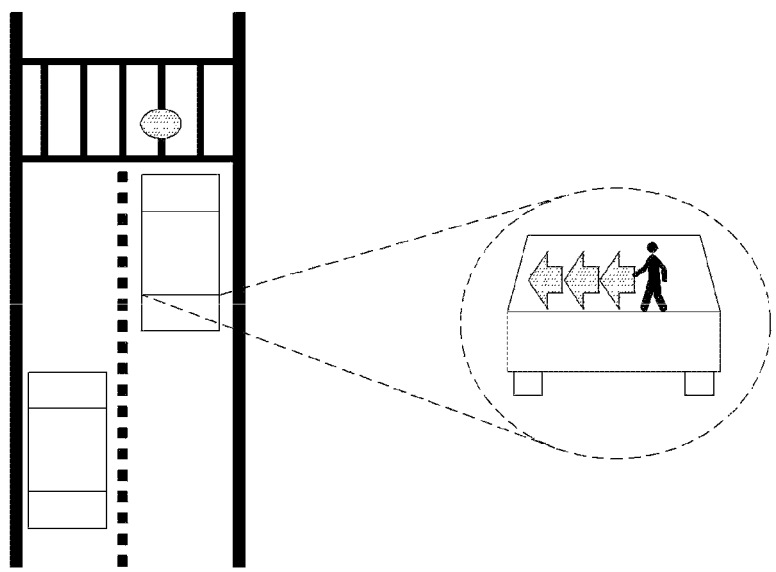
FIG. 11 is an illustration of a method for showing information on a display according to an embodiment of the present disclosure.

FIG. 11 is a view illustrating a method for showing information on a display according to an embodiment of the present disclosure.

Referring to FIG. 11, the moving object senses an object and an event and displays a warning alarm on a display. As described in FIG. 2 above, an object and an event may be detected, and the detected event may be output through an internal or external display. When approaching and stopping near an intersection or a crosswalk, the moving object may detect an object like a pedestrian or a two-wheeled vehicle at the intersection or the crosswalk. Based on this, the moving object may output the presence of a pedestrian or a two-wheeled vehicle at an intersection or a crosswalk through an internal or external display. Herein, the external display may be provided at the rear of the moving object.

Thus, when a situation or an event occurring in front of the moving object is notified through an external display provided at the rear of the moving object, an accident or a collision with an object and another moving object may be prevented.

Figure 12:
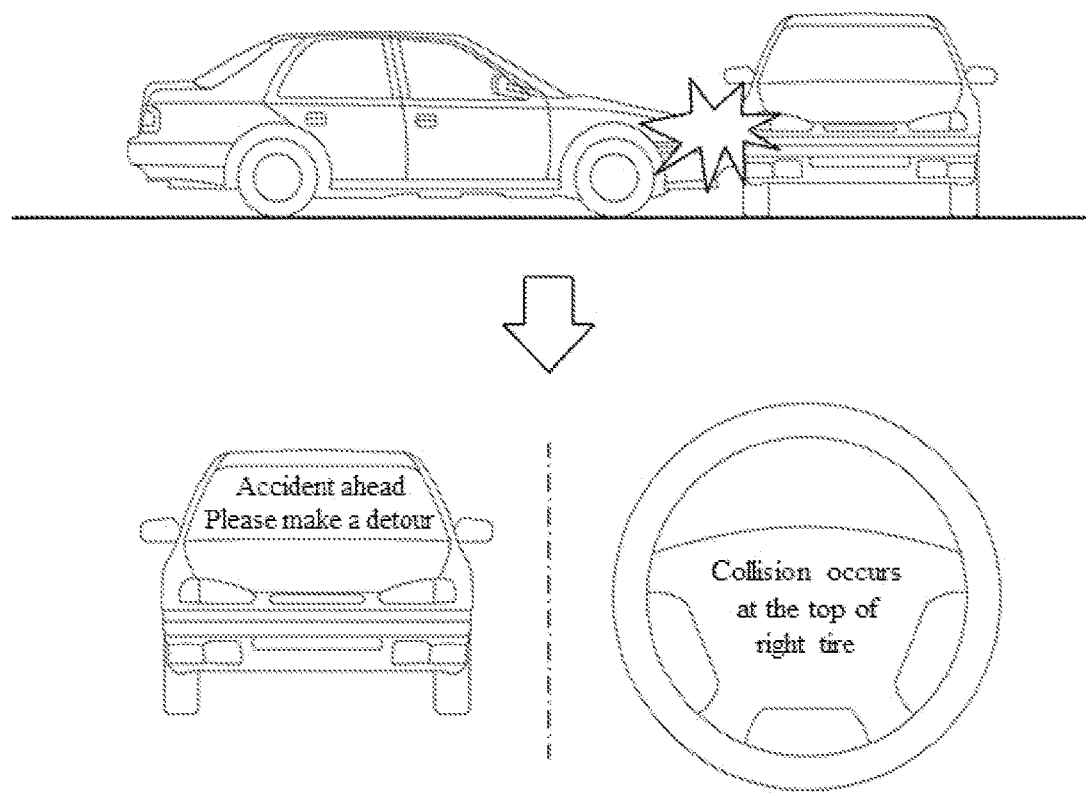
FIG. 12 is another illustration of a method for showing information on a display inside a moving object and a display outside the moving object when an accident occurs to the moving object, according to an embodiment of the present disclosure.

FIG. 12 is a view illustrating a method for showing information on a display inside a moving object and a display outside the moving object when an accident occurs to the moving object.

Referring to FIG. 12, a case where a collision or an accident occurs to the moving object may be considered. When a collision occurs to the moving object, the moving object may provide information related to the collision through its display region. When a collision occurs to the moving object, the moving object may display information related to the accident through an external display apparatus. Based on a collision on the moving object, the moving object may activate an external display apparatus. As an external display apparatus may be provided in various regions of the moving object, based on an impact caused by an accident, the moving object may exclude an external display apparatus incapable of displaying among exterior regions of the moving object. In this case, the moving object may activate only an external display apparatus capable of activating a display region. As a more specific example, when the moving object determines that an external display apparatus provided on a windshield is capable of being activated, the moving object may activate the external display apparatus provided on the windshield. On the other hand, when the moving object determines that an external display apparatus provided on a windshield is impossible to activate, the moving object may activate an external display apparatus provided in another exterior region (e.g., door region) of the moving object other than the external display apparatus provided on the windshield, which is not limited to the above-described embodiment.

In addition, when a collision occurs to the moving object, information related to the collision may be displayed in an internal display region of the moving object. When a collision occurs to the moving object but the collision is not so serious as to deploy an airbag, the moving object may display information related to the collision in an internal display region. The moving object may display information on a collision spot in an internal display region. The moving object may further display other information related to accident handling, which is not limited to the above-described embodiment.

Thus, by displaying an event for the occurrence of a collision or an accident of the moving object through an external display apparatus provided in a rear windshield region, it is possible to prevent a secondary accident of an object or the moving object approaching from behind.

Figure 13:
FIG. 13 is a view illustrating information that is output through a display region, according to an embodiment of the present disclosure.
Figure 13:
Figure 13:
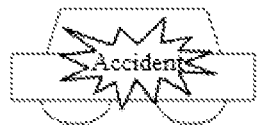
Figure 13:

Moreover, information that is output through an external display apparatus in FIG. 11 and FIG. 12 may be configured in various ways. For example, information output through an external display apparatus may include a text, an emoticon, an icon and the like indicating an event identified by the moving object, as the shapes illustrated in FIG. 13. Furthermore, the moving object may determine the urgency and importance of an identified event (e.g., a situation or state of an object ahead, a situation of a collision or an accident) and may configure and output information that is output through an external display apparatus by considering the urgency and importance.

Figure 14:
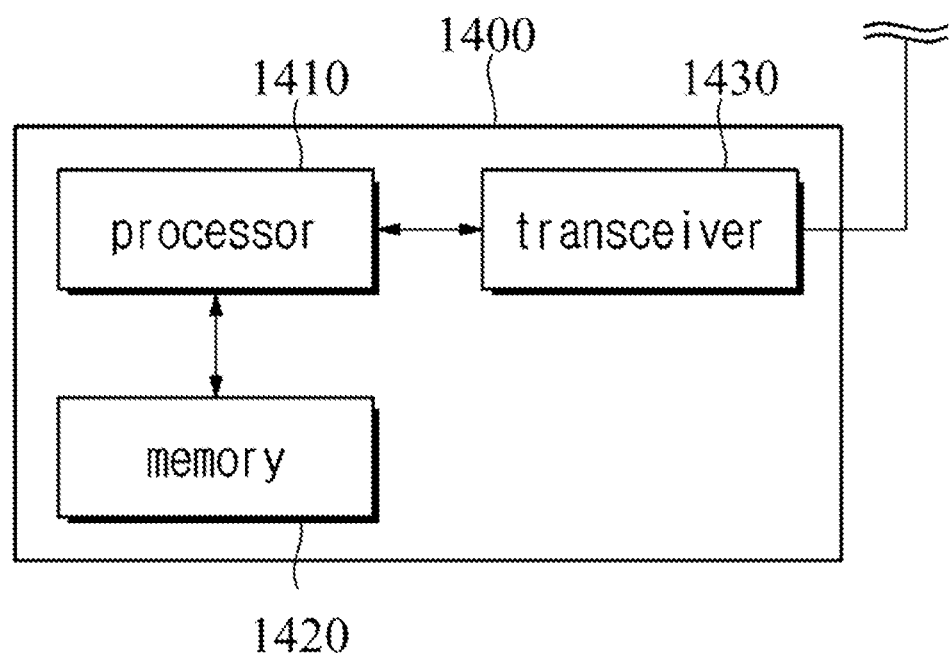
FIG. 14 is a view illustrating an apparatus configuration according to an embodiment of the present disclosure.

FIG. 14 is a view illustrating an apparatus configuration according to an embodiment of the present disclosure.

Referring to FIG. 14, an apparatus may include at least one or more among the above-described moving object, a device, a server and an RSU. In other words, an apparatus may communicate and work with another device, which is not limited to the above-described embodiment. For the above-described operation, an apparatus 1400 may include at least one of a processor 1410, a memory 1420, or a transceiver 1430. In other words, an apparatus may include a necessary configuration for communicating with another apparatus. In addition, an apparatus may include another configuration apart from the above-described configuration. In other words, an apparatus may have a configuration, which includes the above-described apparatus for communicating with another device but is not limited thereto, and may be operated based on what is described above.

Although the exemplary methods of the present disclosure described above are represented by a series of acts for clarity of explanation, they are not intended to limit the order in which the steps are performed, and if necessary, each step may be performed simultaneously or in a different order. In order to implement a method according to the present disclosure, the illustrative steps may include an additional step or exclude some steps while including the remaining steps. Alternatively, some steps may be excluded while additional steps are included.

The various embodiments of the disclosure are not intended to be all-inclusive and are intended to illustrate representative aspects of the disclosure, and the features described in the various embodiments may be applied independently or in a combination of two or more.

In addition, the various embodiments of the present disclosure may be implemented by hardware, firmware, software, or a combination thereof. In the case of hardware implementation, one or more application specific integrated circuits (ASICs), digital signal processors (DSPs), digital signal processing devices (DSPDs), programmable logic devices (PLDs), field programmable gate arrays, a general processor, a controller, a microcontroller, a microprocessor, and the like may be used for implementation.

The scope of the present disclosure includes software or machine-executable instructions (for example, an operating system, applications, firmware, programs, etc.) that enable operations according to the methods of various embodiments to be performed on a device or computer, and a non-transitory computer-readable medium in which such software or instructions are stored and are executable on a device or computer. The one or more application specific integrated circuits (ASICs), the digital signal processor (DSP), the digital signal processing device (DSPD), the programmable logic device (PLD), the field programmable gate array, the processor, the controller, the microcontroller, or the microprocessor may be configured to execute the software or machine-executable instructions to perform the above-described operations so as to control the display device, the airbag module, and/or other elements.

What is claimed is:
1. A method of detecting a collision in a moving object, the method comprising:
    detecting, by the moving object, an object and an event;
    determining, by a processor of the moving object, a situation as at least one of an emergency situation, a manageable situation, or a general situation in response to detecting the detected object and the detected event;
    upon determining that the situation is the manageable situation, determining, by the processor, whether or not it is possible to transmit a warning message for the detected event to the detected object; and
    transmitting, by the processor, collision possibility information to the detected object based on a warning alarm system upon determining that it is impossible to transmit the warning message for the detected event to the detected object,
wherein the method further comprising: executing, by the processor, a warning alarm operation or a collision prevention operation according to an autonomous driving level of the detected object, when the detected object is another moving object.

2. The method of claim 1, wherein the determining a situation includes determining the emergency situation by comparing a Time To Collision (TTC) value between the moving object and the detected object and a threshold value.

3. The method of claim 2, wherein the determining the emergency situation includes:
when the TTC value is less than a first threshold value, determining that the emergency situation has occurred; and
upon determining the emergency situation, controlling to stop the moving object and providing the collision possibility information to the detected object based on the warning alarm system.

4. The method of claim 2 wherein the determining a situation further includes:
when the TTC value is greater than a first threshold value and less than a second threshold value which is greater than the first threshold value, determining the situation as the manageable situation; and
when the TTC value is greater or equal to the second threshold value, determining the situation as the general situation.

5. The method of claim 1, the detecting the object and the event includes detecting the event based on at least one of a position information of the object or information detected by at least one sensor installed in the moving object.

6. The method of claim 1, wherein the determining whether or not it is possible to transmit a warning message includes determining whether or not it is possible to transmit the warning message for the detected event to the detected object based on whether or not the detected object is capable of exchanging messages via communication.

7. The method of claim 6, wherein, when the detected object is another moving object, the moving object determines whether or not it is possible to exchange the messages with the another moving object via communication, and
wherein, when the detected object is a pedestrian, the moving object determines whether or not it is possible to exchange the messages with a device of the pedestrian via communication.

8. The method of claim 1, wherein the transmitting the collision possibility information to the detected object based on the warning alarm system includes determining whether or not the detected object recognizes the detected event.

9. The method of claim 8, further comprising:
upon determining that the detected object recognizes the detected event, ending an operating procedure for the detected event and
upon determining that the object does not recognize the detected event, increasing a horn output value based on the warning alarm system.

10. A moving object for detecting a collision, the moving object comprising:
a transceiver configured to transmit and receive a signal; and
a processor configured to:
control the transceiver,
detect an object and an event,
determine whether or not a situation is a manageable situation based on the detected object and the detected event,
determine whether or not it is possible to transmit a warning message for the detected event to the detected object when the situation is determined as the manageable situation, and
transmit collision possibility information to the detected object based on a warning alarm system when it is impossible to transmit the warning message for the detected event to the detected object,
wherein the processor further configured to execute a warning alarm operation or a collision prevention operation according to an autonomous driving level of the detected object, when the detected object is another moving object.

11. The moving object of claim 10, wherein the whether or not the situation is the manageable situation is determined by comparing a Time To Collision (TTC) value between the moving object and the detected object and a threshold value.

12. The moving object of claim 11, wherein the processor determines the manageable situation when the TTC value is greater than a first threshold value and less than a second threshold value which is greater than the first threshold value.

13. The moving object of claim 10, wherein the processor detects the event based on at least one of a position information of the detected object or information detected by at least one sensor of the moving object.

14. The moving object of claim 10, wherein the processor determines whether or not it is possible to transmit the warning message for the detected event to the detected object based on whether or not the detected object is capable of exchanging messages via communication.

15. The moving object of claim 14,
wherein, when the detected object is another moving object, the processor determines whether or not it is possible to exchange the message with the detected moving object via communication, and
wherein, when the detected object is a pedestrian, the processor determines whether or not it is possible to exchange the message with a device of the pedestrian via communication.

16. The moving object of claim 10, wherein, when transmitting the collision possibility information to the detected object based on the warning alarm system, the processor determines whether or not the detected object recognizes the detected event.

17. The moving object of claim 10, wherein, when the detected object recognizes the detected event, the moving object ends an operating procedure for the detected event, and
wherein, when the detected object does not recognize the detected event, the moving detected object increases a horn output value based on the warning alarm system.

18. A moving object for detecting a collision, the moving object comprising:
a transceiver configured to transmit and receive a signal; and
a processor configured to:
control the transceiver,
determine an operation mode based on a road in which the moving object is driving,
detects an object and an event, and
determine a collision possibility based on the detected object and the detected event, wherein, when the road in which the moving object is driving is a first type road, the moving object detects the object and the event based on a first operation mode, wherein, when the road in which the moving object is driving is a second type road, the moving object detects the object and the event based on a second operation mode, and wherein the processor further configured to execute a warning alarm operation or a collision prevention operation according to an autonomous driving level of the detected object, when the detected object is another moving object.

19. The moving object of claim 18, wherein the first type road is a road in which a driving direction of the moving object is preset based on a road line and pedestrian traffic is impossible, and wherein the second type road is a road in which the driving direction of the moving object is not set and the pedestrian traffic is possible.

20. The moving object of claim 18, wherein, when the moving object operates in the first operation mode, the moving object exchanges a message with other moving objects around the moving object and determines the collision possibility by detecting the object and the event based on the exchanged message, and wherein, when the moving object operates in the second operation mode, the moving object detects a device around the moving object and determines the collision possibility by detecting the object and the event by communicating with the detected device.

* * * * *